United States Patent

Wang et al.

[11] Patent Number: 6,146,747
[45] Date of Patent: Nov. 14, 2000

[54] HIGHLY POROUS POLYVINYLIDENE DIFLUORIDE MEMBRANES

[75] Inventors: I-Fan Wang, San Diego; Jerome F. Ditter, Santa Ana; Robert Zepf, Solana Beach, all of Calif.

[73] Assignee: USF Filtration and Separations Group Inc., Timonium, Md.

[21] Appl. No.: 09/080,713

[22] Filed: May 18, 1998

Related U.S. Application Data

[63] Continuation-in-part of application No. 08/785,962, Jan. 22, 1997, Pat. No. 5,834,107.
[51] Int. Cl.[7] ............................... B32B 1/08; B32B 3/26
[52] U.S. Cl. ................. 428/310.5; 210/490; 210/500.23; 210/500.27; 264/41; 264/216; 427/244; 427/245; 428/315.5; 428/315.7; 428/398
[58] Field of Search ............................. 428/310.5, 315.5, 428/315.7, 398; 210/490, 500.23, 500.27; 264/41, 216; 427/244, 245

[56] References Cited

U.S. PATENT DOCUMENTS

| | | |
|---|---|---|
| 3,615,024 | 10/1971 | Michaels . |
| 4,203,848 | 5/1980 | Grandine, II . |
| 4,384,047 | 5/1983 | Benzinger et al. . |
| 4,629,563 | 12/1986 | Wrasidlo . |
| 4,666,607 | 5/1987 | Josefiak et al. . |
| 4,774,039 | 9/1988 | Wrasidlo . |
| 4,774,132 | 9/1988 | Joffee et al. . |
| 4,798,847 | 1/1989 | Roesink et al. . |
| 4,933,081 | 6/1990 | Sasaki et al. . |
| 5,019,260 | 5/1991 | Gsell et al. . |
| 5,171,445 | 12/1992 | Zepf . |
| 5,188,734 | 2/1993 | Zepf . |
| 5,282,971 | 2/1994 | Degen et al. . |
| 5,514,461 | 5/1996 | Meguro et al. . |
| 5,626,805 | 5/1997 | Meguro et al. . |
| 5,834,107 | 11/1998 | Wang et al. .................. 428/310.5 |

FOREIGN PATENT DOCUMENTS

| | | |
|---|---|---|
| 0 037 836 | 10/1981 | European Pat. Off. ........ B01D 13/00 |
| 2 199 786 | 7/1988 | United Kingdom . |
| WO 93/22034 | 11/1993 | WIPO . |

OTHER PUBLICATIONS

Patent Abstracts of Japan; Publication No. 06296836; Published Oct. 25, 1994; Applicant: Asahi Chem Inc. Co. Ltd.

*Primary Examiner*—Blaine Copenheaver
*Attorney, Agent, or Firm*—Knobbe, Marten, Olson & Bear LLP

[57] ABSTRACT

The present invention relates to the field synthetic polymeric membrane materials formed from casting polyvinylidene difluoride (PVDF) polymer solutions and/or dispersions. Membranes formed in accordance with the present invention are all highly porous. Both internally isotropic membranes and highly asymmetric PVDF membranes are disclosed. Membranes of the invention may be hydrophobic or hydrophilic. The membranes of the invention are useful in a variety of microfiltration and ultrathin applications.

28 Claims, 14 Drawing Sheets

HIGHLY POROUS POLYVINYLIDENE DIFLUORIDE MEMBRANES

This application is a CIP of 08/785,962, filed Jan. 22, 1997, now U.S. Pat. No. 5,834,107.

BACKGROUND OF THE INVENTION

1. Field of the Invention

The present invention relates to the field of synthetic polymeric membrane materials formed from casting polyvinylidene difluoride (PVDF) polymer solutions and/or dispersions. Membranes formed in accordance with the present invention are all highly porous. Both internally isotropic membranes and highly asymmetric PVDF membranes are disclosed. Membranes of the invention may be hydrophobic or hydrophilic. The membranes of the invention are useful in a variety of microfiltration applications.

2. Background of the Technology

Significant interest and efforts have been invested into the manufacture of PVDF polymer membranes. The basic reason for the interest in PVDF membranes as filters is that PVDF is resistant to oxidizing environments including ozone which is used extensively in the sterilization of water. PVDF is also resistant to attack by most mineral and organic acids, aliphatic and aromatic hydrocarbons, alcohols, and halogenated solvents. It is soluble in certain aprotic solvents, such as dimethylformamide, N-methyl pyrrolidone, and hot acetone. Further, PVDF has good physical properties over temperatures ranging from −50 to 140° C.

Grandine prepared what many consider the first practical PVDF microporous membrane, as described in U.S. Pat. No. 4,203,848. The membrane was prepared through a wet-thermal type phase inversion process. In the process, the PVDF was dissolved in acetone, at its boiling point of 55° C. After casting, the membrane was quenched both thermally and in a water/acetone (20/80 by volume) quench bath. Acetone is a good solvent for PVDF at 55° C. but a poor one at room temperature, so in effect Grandine used a combination of thermal and liquid quench.

Benzinger cast PVDF ultrafilters from formulations that preferably used triethyl phosphate as solvent and a variety of hydroxy compounds as nonsolvents. See U.S. Pat. No. 4,384,047. Josefiak disclosed PVDF as one of several "porous shaped bodies" that is cast utilizing a thermal quenching process. See U.S. Pat. No. 4,666,607. U.S. Pat. No. 4,774,132 to Joffee et al. discloses preparation of activated and modified PVDF structures. Similarly, Degen et al., in U.S. Pat. No. 5,282,971 disclosed PVDF membranes modified to contain quaternary ammonium groups covalently bound to the membrane. In U.S. Pat. No. 5,019,260 to Gsell et al., PVDF filtration media having low protein affinities were disclosed.

Costar Corporation, in published PCT Application No. WO 93/22034, discloses the preparation of PVDF membranes that are alleged to possess improved flow rates. The membranes, however, appear to possess an entirely isotropic structure containing a dense array of closely aligned and contiguous polymer particles. The pores in the membrane appear structurally similar to a sintered metal.

Sasaki et al. disclosed a PVDF formulation in U.S. Pat. No. 4,933,081 and GB 2,199,786A, published Jul. 20, 1988 (the "Fuji patent"). The PVDF formulation of Example 1 had a relatively high polymer concentration (20%) that was exposed to 60° C. air with 30% relative humidity. In addition, the Fuji formulations included a high concentration of polyvinylpyrrolidone, used as a co-solvent/swelling agent. The surface pores in the Fuji PVDF membrane appear to be between about 0.45 $\mu$m and 0.65 $\mu$m, and the thicknesses of the membranes ranges from 100 $\mu$m to 110 $\mu$m.

Membranes of the prior art have been rendered hydrophilic by any of several methods. Each of these methods for imparting hydrophilicity to membranes has inherent problems or difficulties. For example, where a membrane is post-treated with a moiety to impart hydrophilicity there is a potential that the moiety will leach and contaminate the sample. One can attempt to minimize leaching through crosslinking certain moieties on the surface of the cast membrane. For example, Roesink et al. in U.S. Pat. No. 4,798,847 (now Re. No. 34,296) disclose crosslinking PVP throughout the structure of polysulfone membranes. However, while crosslinking hydrophilic moieties to membranes may minimize leaching, it can add additional steps and complexities to the fabrication process of a membrane. Further, depending on the conditions required for the crosslinking, membrane strength and/or rigidity can be compromised.

Another approach to imparting hydrophilicity to membranes involves the inclusion of a hydrophilic moiety within the casting suspension. For example, Kraus et al. in U.S. Pat. Nos. 4,964,990 and 4,900,449 disclose formation of hydrophilic microfiltration membranes from hydrophobic polymers through inclusion in the casting solution of a hydrophilic polymer, such as polyethylene glycol or polyvinylpyrrolidone. The membranes prepared in accordance with the Kraus patents are, however, limited to polyethersulfone formulations, and are isotropic. They are therefore not well suited to applications that require asymmetric PVDF membranes.

With respect to structure, the membranes of the Sasaki patent are all disclosed to possess two degrees of asymmetry. In cross-section, the membranes have a microporous face and a coarse pore face. The diameter of the pores first decreases along a line from the microporous face to the coarse pore face, reaching a minimum pore size between the microporous face and the coarse pore face of the membrane. Thereafter, the pore sizes increase along a line toward the coarse pore surface, but the increase, and hence the asymmetry of the membrane, is not as dramatic as in a classic Wrasidlo (U.S. Pat. No. 4,629,563) asymmetric membrane.

Asymmetric or anisotropic membranes are well known in the art. For example, Wrasidlo in U.S. Pat. Nos. 4,629,563 and 4,774,039 and Zepf in U.S. Pat. Nos. 5,188,734 and 5,171,445, the disclosures of which are hereby incorporated by reference, each disclose asymmetric membranes and methods for their production. The Wrasidlo patent disclosed the first truly asymmetric microfiltration membrane. "Asymmetric" as used in the context of the Wrasidlo patent refers to membranes that possess a progressive change in pore size across the cross-section between the microporous skin and substructure. This stands in contrast to reverse osmosis and most ultrafiltration membranes which have abrupt discontinuities between a "nonmicroporous skin" and the membrane substructure, and which are also referred to in the art as asymmetric.

Each of the Wrasidlo and Zepf patents discloses highly asymmetric, integral, microporously skinned membranes, having high flow rates and excellent retention properties. The membranes are generally prepared from a modified "phase inversion" process using a metastable two-phase liquid dispersion of polymer in a solvent/nonsolvent system which is cast and subsequently contacted with a nonsolvent. The Zepf patent discloses an improvement over the Wrasidlo patent.

Phase inversion processes generally proceed through the steps of: (i) casting a solution or a mixture comprising a suitably high molecular weight polymer(s), a solvent(s), and a nonsolvent(s) into a thin film, tube, or hollow fiber, and (ii) precipitating the polymer through one or more of the following mechanisms:

(a) evaporation of the solvent and nonsolvent (dry process);

(b) exposure to a nonsolvent vapor, such as water vapor, which absorbs on the exposed surface (vapor phase-induced precipitation process);

(c) quenching in a nonsolvent liquid, generally water (wet process); or (d) thermally quenching a hot film so that the solubility of the polymer is suddenly greatly reduced (thermal process).

Schematically, the inversion in phase from a solution to a gel proceeds as follows:

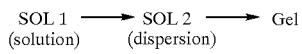

Essentially, SOL 1 is a homogenous solution, SOL 2 is a dispersion, and the Gel is the formed polymer matrix. The event(s) that triggers SOL 2 formation depends on the phase inversion process used. Generally, however, the triggering event(s) revolves around polymer solubility in the SOL. In the wet process, SOL 1 is cast and contacted with a nonsolvent for the polymer which triggers the formation of SOL 2 which then "precipitates" to a Gel. In the vapor phase-induced precipitation process, SOL 1 is cast and exposed to a gaseous atmosphere including a nonsolvent for the polymer which triggers the formation of SOL 2 which then "precipitates" to a Gel. In the thermal process, SOL 1 is cast and the temperature of the cast film is reduced to produce SOL 2 which then "precipitates" to a Gel. In the dry process, SOL 1 is cast and contacted with a gaseous atmosphere, such as air, which allows evaporation of one or more of the solvents which triggers the formation of SOL 2 which then "precipitates" to a Gel.

The nonsolvent in the casting dope is not always completely inert toward the polymer; in fact it usually is not inert, and is often referred to as swelling agent. In the Wrasidlo-type formulations, as discussed later, selection of both the type and the concentration of the nonsolvent is important in that it is the primary factor in determining whether or not the dope will exist in a phase separated condition.

In general, the nonsolvent is the primary pore forming agent, and its concentration in the dope greatly influences the pore size and pore size distribution in the final membrane. The polymer concentration also influences pore size, but not as significantly as does the nonsolvent. It does, however, affect the membrane's strength and porosity. In addition to the major components in the casting solution, or dope, there can be minor ingredients, such as, for example, surfactants or release agents.

Polysulfone is especially amenable to formation of highly asymmetric membranes, particularly in the two-phase Wrasidlo formulations. These are not homogeneous solutions but consist of two separate phases: one is a solvent-rich clear solution of lower molecular weight polymer at low concentrations (e.g., 7%); the other is a polymer-rich, turbid, colloidal solution of higher molecular weight polymer at high concentrations (e.g., 17%). The two phases contain the same three ingredients, that is, polymer, solvent, and nonsolvent, but in very different concentrations and molecular weight distributions. Most importantly, the two phases are insoluble in one another and, if allowed to stand, will separate. The mix therefore must be maintained as a dispersion, with constant agitation until the time that it is cast as a film. Essentially, in Wrasidlo type formulations, the casting dope is provided in a SOL 2 (dispersion) condition. Thus, the dispersion serves as the starting point for gel formation and not as the intermediate step (above), as follows:

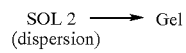

This process modification was largely responsible for the higher degrees of asymmetry and uniform consistency of the Wrasidlo Membranes as compared to the prior art.

It is the nonsolvent and its concentration in the casting mix that produces phase separation, and not every nonsolvent will do this. The two phases will separate from one another if allowed to stand, but each individual phase by itself is quite stable. If the temperature of the mix is changed, phase transfer occurs. Heating generates more of the clear phase; cooling does the reverse. Concentration changes have the same effect, but there is a critical concentration range, or window, in which the phase separated system can exist, as discussed by Wrasidlo. Wrasidlo defines this region of instability on a phase diagram of thus dispersed polymer/solvent/nonsolvent at constant temperature, lying within the spinodal or between spinodal and binodal curves, wherein there exist two macroscopically separated layers.

Because of the great hydrophobicity of the polymer and because of the thermodynamically unstable condition of the casting mix, wherein there pre-exist two phases, one solvent-rich and the other polymer-rich (a condition that other systems must pass through when undergoing phase inversion), the unstable Wrasidlo mixes precipitate very rapidly when quenched so as to form a microporous skin at the interface and consequently develop into highly asymmetric membranes, a structure shared by the membranes of each of the Wrasidlo and Zepf patents.

The microporous skin is the fine pored side of the membrane that constitutes the air-solution interface or the quench-solution interface during casting. In the Wrasidlo patent, and in this disclosure, it is understood that the term "skin" does not indicate the relatively thick, nearly impervious layer of polymer that is present in some membranes. Herein, the microporous skin is a relatively thin, porous surface that overlies a microporous region of variable thickness. In an asymmetric membrane, the pores of the microporous region gradually increase in size as they lead from the skin to the opposite face of the membrane. The region of gradual pore size increase is sometimes referred to as the asymmetric region, and the opposite, non-skin face of the membrane is often referred to as the coarse pored surface. As a contrast to the coarse pored surface, the skin is also sometimes called the microporous surface.

In some formulations and casting conditions, a "skinning" effect can occur at the opposite surface of the membrane—the surface that is in contact with the casting support and that is not exposed directly to humid air or to the quench bath in the casting process. Where such a layer of "opposite skin" exists, it is usually relatively thin, typically being less than about 10% of the thickness of the membrane. It is also usually highly porous, although the porous network or web may have a more densely packed appearance in cross section than the internal region of the membrane between the two skins, if both are present.

Polymeric membranes can also be cast from homogeneous solutions of polymer. The composition of these formulations lies outside of the spinodal/binodal region of the phase diagram of Wrasidlo. Membranes cast from homogeneous solutions may also be asymmetric, although they are not usually as highly asymmetric as those cast from phase separated formulations.

The Wrasidlo membranes have improved flow rates and permselectivity in relation to prior art membranes. Such improved flow rates and permselectivity arise from the structure of the membranes.

The Zepf patents disclose improved Wrasidlo-type polymer membranes having a substantially greater number of microporous skin pores of more consistent size, and greatly increased flow rates, with reduced flow covariance for any given pore diameter. The improved Zepf membranes are achieved by modifications to the Wrasidlo process, comprising reduced casting and quenching temperatures, and reduced environmental exposure between casting and quenching. Zepf further teaches that reduced casting and quenching temperatures minimize the sensitivity of the membrane formation process to small changes in formulation and process parameters.

The Wrasidlo patents also disclose the preparation of PVDF asymmetric membranes. See U.S. Pat. No. 4,774,039, Example 6, Column 12, lines 20–34. However, the PVDF membranes prepared in accordance with the Wrasidlo patent do not appear to have been microporous membranes.

None of the microporous PVDF membranes of the prior art discussed herein possesses a highly asymmetric structure. Consequently all prior art PVDF membranes are limited in their flow rates as compared to highly asymmetric membranes. Therefore, as will be appreciated by those of ordinary skill in the art, it would be desirable to provide a microporous PVDF membrane having a high degree of asymmetry and high flow rates. Further, it would be beneficial to provide ultrathin microporous PVDF membranes having high flow rates, whether isotropic or asymmetric in structure. In addition, it would be desirable to provide highly asymmetric PVDF membranes that are either hydrophobic or hydrophilic. It would also be beneficial to provide methods to enable the consistent production of each of such membranes.

SUMMARY OF THE INVENTION

In accordance with the present invention, we have unexpectedly discovered that it is possible to prepare a microporous, highly asymmetric PVDF membrane that possesses exceptional flow rates. We have further discovered that it is possible to prepare microporous, internally isotropic PVDF membranes that, in cross-section, possess a lattice of filamentous webs of polymer material.

Thus, in a first aspect of the invention there is disclosed a microporous PVDF polymer membrane having a microporous surface with minimum pores, and an opposite surface with maximum pores. The space between the surfaces is a porous support formed from filamentous webs of polymer material. The membrane of this aspect of the invention may use as its PVDF HYLAR-461, and it may also contain in some embodiments about 1–3%, 4–8%, or in other embodiments about 10% or 12% to about 18%–22%, or in still other embodiments up to about 30% by weight of polyvinylpyrrolidone (PVP), of which a preferred type is a PVP with an average molecular weight of about 45,000 daltons. Alternatively, the membrane may contain PVP having an average molecular weight of 600,000, 450,000, 360,000, 270,000, 180,000, 120,000, or 90,000 or 60,000 daltons. In other embodiments, the PVP used may be about 9,000, 15,000, or 30,000 daltons. The membrane may be rendered hydrophilic by contacting it with a wetting agent, such as hydroxypropylcellulose (HPC), or the wetting agent may be a surfactant. Further, the membrane of this aspect of the invention may have a supporting material laminated to it, such as, for example, a nonwoven polymer fabric. The membrane of this aspect of the invention need not be in the form of a planar sheet, but may also be prepared and used in the form of a hollow fiber.

In a second aspect of the invention, the PVDF membrane again has a microporous surface with minimum pores, and an opposite surface with maximum pores. The space between the surfaces is a porous support formed from filamentous webs of polymer material. The membrane of this aspect of the invention may also have an integral asymmetric structure with the ratio of the average diameter of the maximum pores to the average diameter of the minimum pores being from about 5, 10, or 20 to about 50, 100, 250, or 500. Membranes of this aspect of the invention may have a flow rate of water of from about 25, 50, or 100 to about 200, 350, or 500 cm/min at 10 psid. They may have a thickness of less than about 140 μm and preferably may have a thickness of less than about 70 μm. Membranes of this aspect of the invention may have a bubble point of water of from about 0.5, 2, or 5 to about 10, 25, or 50 psid. The porous support structure of the membranes of this aspect of the invention may consist of a gradient of gradually increasing pore sizes from the microporous surface to the opposite surface.

In a third aspect of the invention, the PVDF membrane has a microporous surface with minimum pores, an opposite surface with maximum pores, and the space between the surfaces is a porous support formed from filamentous webs of polymer material. The membranes may have an isotropic structure through at least about 80% of the thickness of the membrane, and the thickness may be less than about 75 μm, and may be preferably less than about 30 μm.

A fourth aspect of the invention provides a method of preparing a PVDF membrane by providing a casting dope with between about 12% and 20% by weight of PVDF and between about 1% and 30% by weight of a hydrophilic polymer, such as PVP, dissolved in a solvent, casting the dope to form a thin film, exposing the thin film to a gaseous environment, coagulating the film in a water bath, and recovering a formed microporous PVDF polymer membrane. The membrane made by this method may have a microporous surface with minimum pores, an opposite surface with maximum pores, and a porous support between the surfaces, with the porous support being formed from filamentous webs of polymer material. In the method, the dope mix may have a temperature of between about 21° C. and about 35° C. during the casting step, and the gaseous environment may have a relative humidity of water between about 50% and 100%. The exposing step may have a duration of about 2 seconds to about 120 seconds, and the quench water bath may have a temperature between about 20° C. and 80° C. The PVP in the dope mix may have an average molecular weight of about 45,000 daltons. The casting and quenching may be followed by contacting the formed membrane with a wetting agent, such as HPC and/or a surfactant, to render the membrane hydrophilic. The method may also include a step of laminating the formed membrane onto a woven or nonwoven polymer fabric for support.

The invention, in a fifth aspect thereof, provides an asymmetric integral microporous PVDF polymer membrane with a microporous surface having minimum pores, an opposite surface having maximum pores, and a region between the surfaces. This region may be a porous support formed from filamentous webs of polymer material, while the porous support may have flow channels whose diameters gradually increase along a gradient from the microporous surface to the opposite surface.

A sixth aspect of the invention is an internally isotropic microporous PVDF polymer membrane with a microporous surface having minimum pores of a given average diameter a first average diameter, and an opposite surface having maximum pores of a different given average diameter. The space between the membrane surfaces may be a porous support formed from filamentous webs of polymer material, and may have flow channels with relatively constant diameters. Thus in this aspect of the invention, the membrane may have three regions. One region, near the microporous surface, may be less than 10% of the overall thickness of the membrane and may have a pore size similar to the size of the skin pores on the microporous side. Another region may be near the opposite surface, may be less than 10% of the overall thickness of the membrane, and may have a pore size similar to that of the pores on the opposite surface. The middle region of the membrane may occupy up to 80% or more of the thickness of the membrane, and may have flow channels that are substantially constant in diameter, and that are intermediate in size compared with the channels near either surface of the membrane.

A seventh aspect of the invention is an improved filtering device with a membrane for filtering aqueous solutions. The improvement is an ozone resistant microporous PVDF polymer membrane with a microporous surface having minimum pores, an opposite surface having maximum pores, and a porous support between the surfaces. The porous support may be formed from filamentous webs of polymer material, and the ozone resistant membrane may have a flow rate of water of from about 25 to about 500 cm/min at 10 psid.

The invention provides an internally hydrophilic polyvinylidene difluoride polymer membrane. This membrane has a first surface with minimum pores having a first average diameter, a second surface having maximum pores with a second average diameter, and a thickness therebetween. Between the surfaces of the membrane is a porous support formed from filamentous webs of polymer material The polymer material has integrally located therein sufficient hydrophilic moieties to render the membrane inherently water wettable.

The membrane of this aspect of the invention may be an ultrafilter, and may have a molecular weight cutoff of, for example, about 100,000 daltons, or about 10,000 daltons. Likewise the membranes of this aspect of the invention also include microporous membranes, having minimum pores in from about 0.01 micron to about 3.0 microns in diameter.

The membranes of this aspect of the invention may have an integral asymmetric structure, wherein the first average diameter is less than the second average diameter, and wherein the porous support has openings in the filamentous web, the openings increasing gradually in size in a gradient from the first surface toward the second surface. Such membranes may have a pore diameter ratio between the second and first surfaces of between about 5 and about 10,000.

The membranes of the invention may contain HYLAR-461 PVDF. They may further contain from about 1% to about 30% by weight polyvinylpyrrolidone. The polyvinylpyrrolidone may include a form having an average molecular weight of about 45,000 daltons, a form having an average molecular weight of about 360,000 daltons, or both forms. The membranes of the invention may have a supporting material laminated thereto, such as, for example, a nonwoven polymer fabric. The membranes may also be made in the form of hollow fibers.

These membranes may have water flow rates of from about 25 to about 500 cm/min at 10 psid, and may have bubble points of water of from about 0.5 to about 50 psid. The invention also contemplates membranes having an isotropic structure through at least about 80% of the thickness of the membrane.

In another aspect, the present invention provides a method of preparing a polyvinylidene difluoride membrane. The method may include the following steps: providing a casting dope having between about 12% and 20% by weight of polyvinylidene difluoride and between about 1% and 30% by weight of a hydrophilic polymer, dissolved in a solvent; casting the dope to form a thin film; exposing the thin film to a humid gaseous environment; coagulating the film in a water bath; and recovering a formed, internally hydrophilic, polyvinylidene difluoride polymer membrane as described herein. According to this method, the dope may have a temperature of between about 35° C. and about 50° C. during the casting step, and the gaseous environment may have a relative humidity of water between about 50% and 100%. The duration of the exposing step may be from about 2 seconds to about 120 seconds. The water bath temperature may be from about 20° C. to 80° C.

In this method, the hydrophilic polymer may include polyvinylpyrrolidone, which may be used in a form having an average molecular weight of about 45,000 daltons, or in a form having an average molecular weight of about 360,000 daltons, in it may include both forms. The method may also include the additional step of laminating to the formed membrane a support material, such as, for example, a nonwoven polymer fabric.

In a further aspect, the invention provides an internally isotropic, internally hydrophilic, polyvinylidene difluoride polymer membrane, having a first surface with minimum pores of a first average diameter, an opposite surface having maximum pores of a second average diameter, and a thickness therebetween. The thickness may be a porous support formed from filamentous webs of polymer material, wherein the porous support includes flow channels having diameters, and wherein the diameters of the flow channels substantially correspond to the first average diameter within a first region of the porous support adjacent the microporous surface, while the diameters of the flow channels substantially correspond to the second average diameter within a second region of the porous support adjacent the opposite surface. In such a membrane, the diameters of the flow channels between the first region of the porous support and the second region of the porous support are substantially constant.

BRIEF DESCRIPTION OF THE DRAWINGS

FIG. 1 is a series of scanning electron micrographs (SEMs) showing cross-sectional views of membranes for comparison purposes.

FIG. 2 is a series of SEMs showing various views of an internally isotropic membrane in accordance with the invention.

FIG. 3 is a series of SEMs showing various views of another internally isotropic membrane in accordance with the invention.

FIG. 4 is a pair of SEMs showing views of an asymmetric membrane in accordance with the invention.

FIG. 5 is a pair of SEMs showing views of an internally hydrophilic asymmetric membrane in accordance with the invention.

DETAILED DESCRIPTION OF THE PREFERRED EMBODIMENT

Figure 1A:
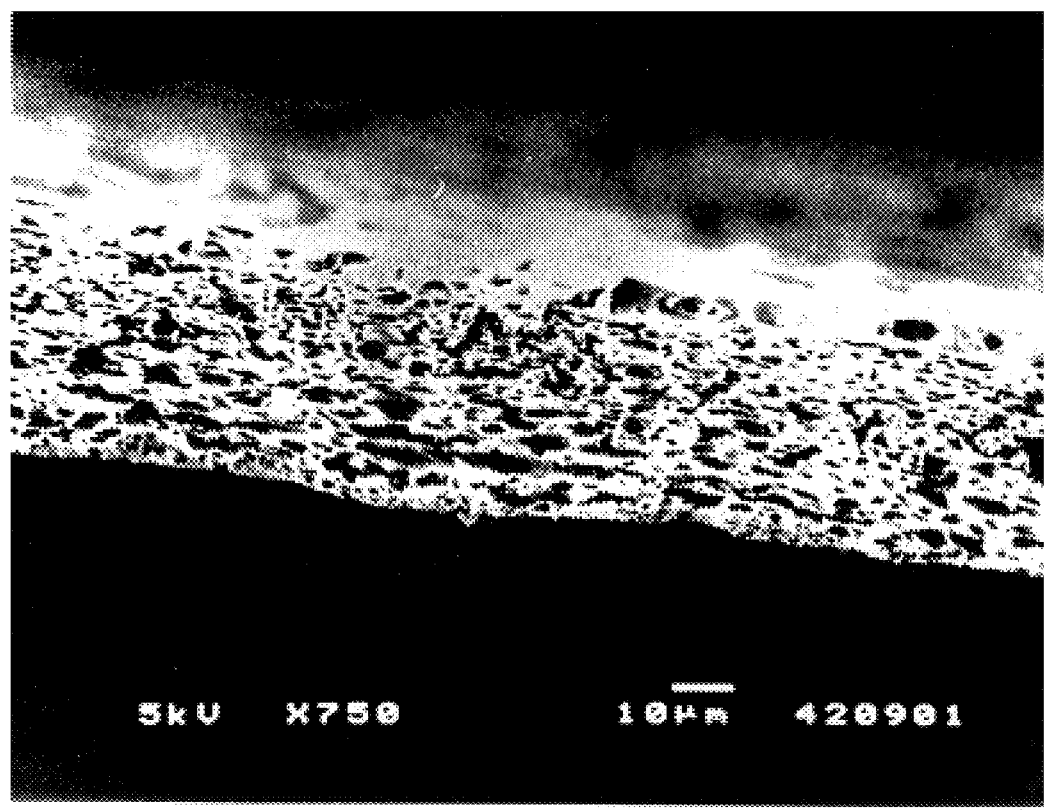
FIG. 1a is an internally isotropic PVDF membrane in accordance with the invention (500×)
Figure 1B:
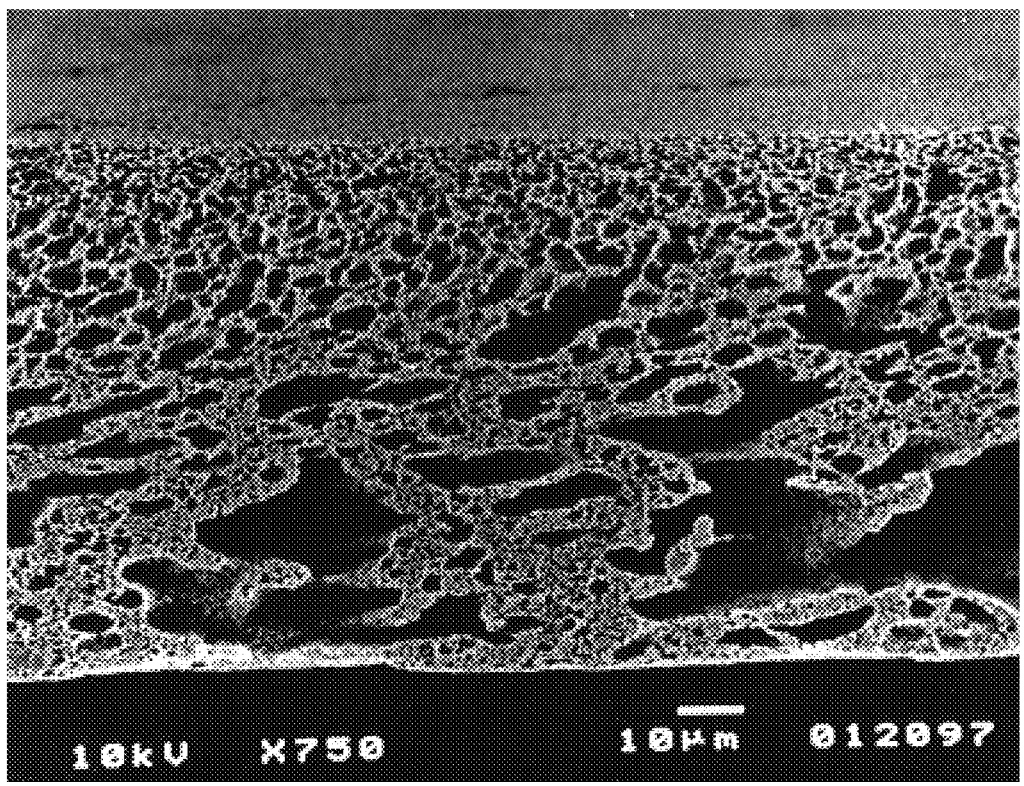
FIG. 1b is an asymmetric PVDF membrane in accordance with the invention (1,000×)
Figure 1C:
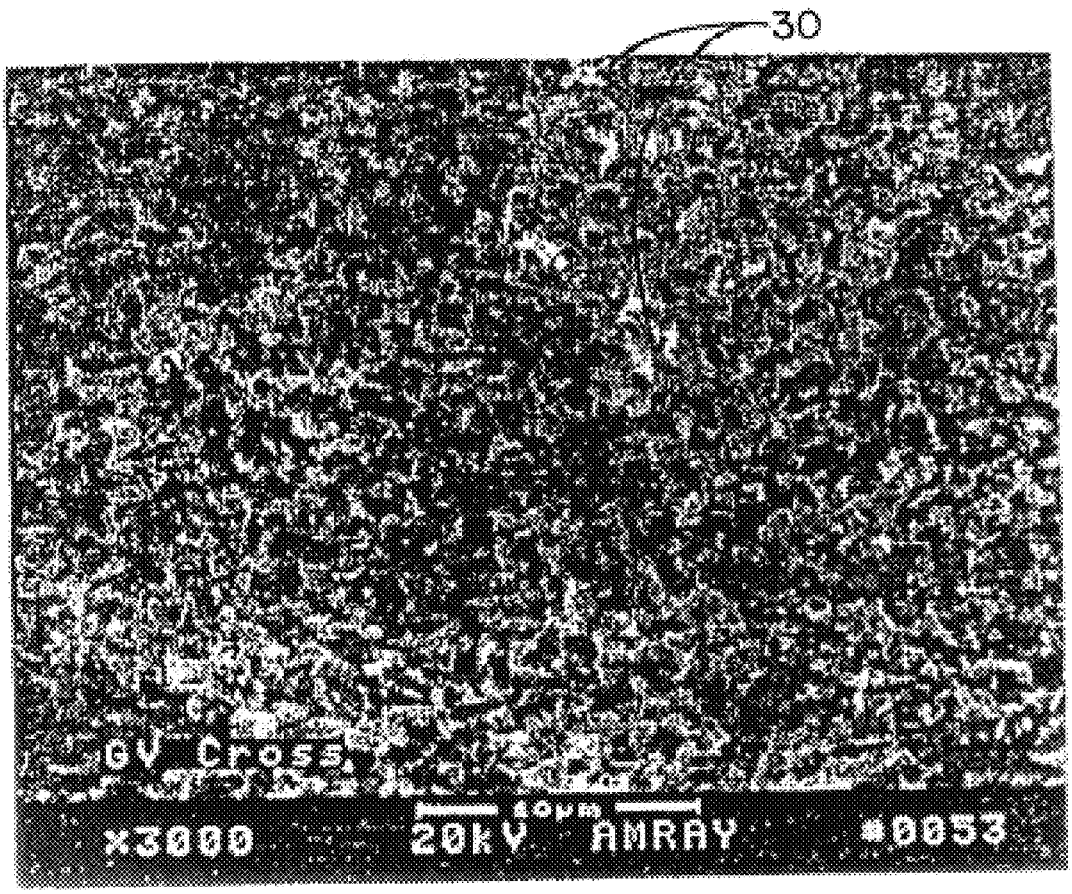
FIGS. 1c and 1d are copies of SEMs from Costar World Patent Application No. WO 93/22034 showing the cross-sectional structures of its PVDF membranes (3000×).
Figure 1D:
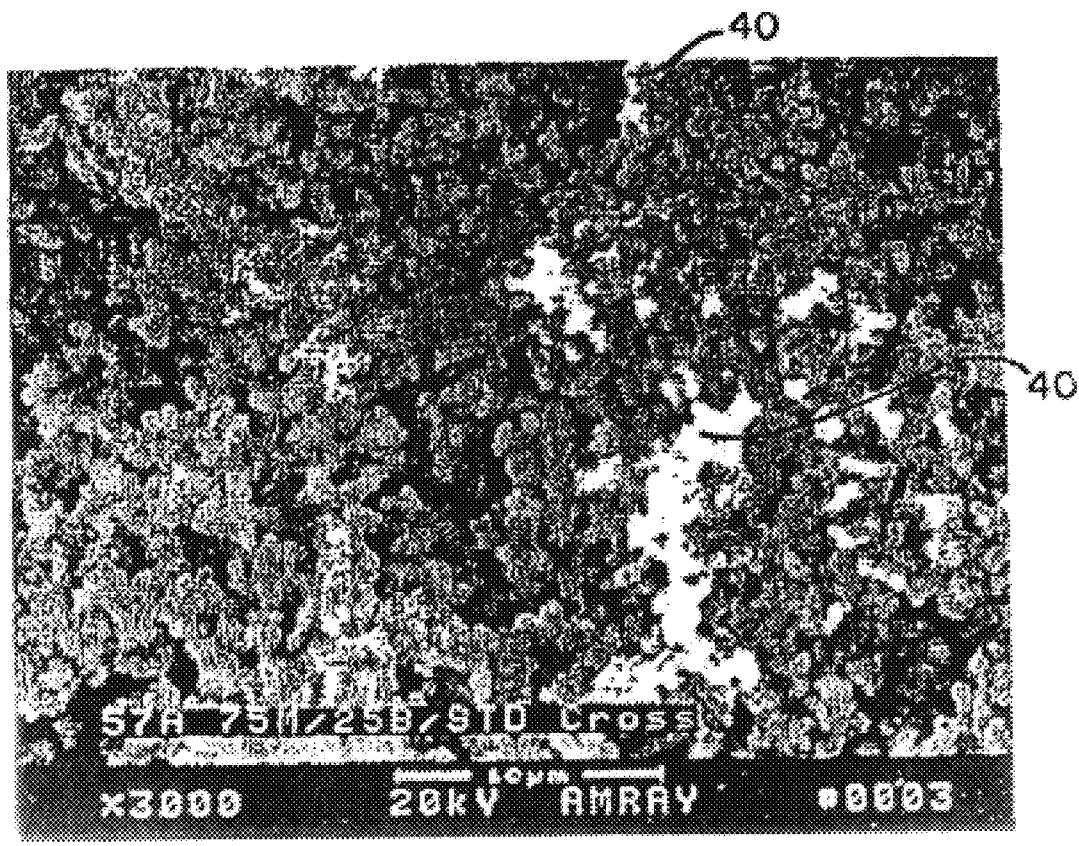

As mentioned above, the present invention relates to our unexpected discovery that it is possible to prepare microporous PVDF membranes having exceptional flow rates in two distinct structural forms: internally isotropic and highly asymmetric. The commonality between the two distinct membrane structures lies in the porous structure that is apparently formed by the manner in which the polymer gels. This commonality is readily observed upon examination of cross-sectional SEMs of membranes in accordance with the invention in comparison to prior art membranes.

For example, referring now to FIG. 1, four cross-sectional SEM views are provided for comparison purposes: FIG. 1a is an internally isotropic PVDF membrane in accordance with the invention (500×); FIG. 1b is an asymmetric PVDF membrane in accordance with the invention (1,000×); and FIGS. 1c and 1d are copies of SEMs from Costar World Patent Application No. WO 93/22034 showing the cross-sectional structures of its PVDF membranes (3000×). As will be observed, the internally isotropic membrane in accordance with the present invention (FIG. 1a) possesses relatively fibrous webs of polymer material. Similarly, the asymmetric membrane of the invention (FIG. 1b) has a region, from the microporous surface (or shortly below) to a point approximately three-quarters of the way to the open pored surface, where the structure clearly includes interconnected strands or webs of polymer material. In contrast, the Costar membrane (FIGS. 1c and 1d) does not appear to possess a strand or web structure that may be described as a filamentous web. Rather, the polymer appears to have gelled in a globular or particulate manner, similar to a sintered metal structure.

An additional common feature shared between the internally isotropic and highly asymmetric membranes prepared in accordance with the invention is the fact that both kinds of membranes possess a constricted pore region in or adjacent to the microporous surface. That is to say that the membranes in accordance with the invention possess a more open substructure than the area or region in or surrounding the microporous surface. This structure allows membranes of the invention to present significantly less resistance to a fluid stream when the coarse pores are placed in contact with the incoming feed. Selectivity of the membrane is tied to the constricted pores in or adjacent to the microporous surface.

As used herein, the term "microporous" relates to membranes having microporous membrane surfaces, with average pore diameters exceeding about 0.01 μm. Maximum pore diameters in the microporous surface preferably do not exceed about 8 μm. As will be appreciated, membranes having average pore diameters that are less than 0.01 μm are typically classified as ultrafiltration, reverse osmosis, and gas separation membranes.

"Internally isotropic" as used herein refers to membranes that either possess a substantially uniform pore size diameter through the bulk of the cross-section of the membrane, or to membranes that do not possess any significant pore size gradient from the microporous surface to the opposite face. For example, an internally isotropic membrane may possess relatively smaller pores in the microporous surface and relatively larger pores in the porous polymer substructure, however, the pore sizes generally do not gradually increase from the microporous surface into the polymer substructure. Rather, the microporous surface is a relatively thin, dense region possessing a higher density of pores per unit of area than the porous substructure, which is a relatively thicker, less dense region having a lower pore density. Accordingly, internally isotropic membranes in accordance with the present invention can display a relatively abrupt transition in pore size between the microporous surface and the opposite surface, which is in contrast to the gradient of gradually increasing pore sizes from the microporous fact to the opposite face such as is found in Wrasidlo-type asymmetric membranes.

Because the membranes of the present invention may also have a relatively dense skin region near the opposite surface of the membrane, it is possible for an internally isotropic membrane to have surface pore diameters at both surfaces that are very similar to those of a highly asymmetric membrane. Accordingly, one cannot conclude that a membrane of the present invention is internally isotropic or highly asymmetric based on surface pore data alone. The key feature is the internal region: usually at least about the middle 80% of the thickness of the membrane. In highly asymmetric membranes, this internal region is characterized by pores or flow channels of gradually increasing diameters. In contrast, the internal region of internally isotropic membranes has pores or flow channels of substantially constant diameter. The structural difference is generally very clear in SEMs, and is also usually evident from data on the flow rates of membranes having the different internal structures. We have found, and disclose herein, a method for reproducibly controlling and manipulating this internal membrane structure.

The term "asymmetric" as used herein relates to a membrane possessing a pore size gradient. That is, asymmetric membranes possess their smallest or finest pores in or adjacent to the microporous surface. The increase in pore size between the microporous surface and the opposite surface of the membrane is generally gradual, with the smallest pore size nearest the microporous surface and the largest pores being found at or adjacent to the opposite, coarse pored surface.

"Integral" as used herein refers to membranes that are cast from a single polymer solution or dope. This is in contrast to non-integral or composite membranes that are cast from more than one polymer solution or dope to form a layered or composite membrane. Composite membranes may also be assembled from two or more fully formed membranes after casting.

Preferred membranes in accordance with the invention are integral, microporous membranes having microporous surfaces with pore sizes ranging from about 0.01 μm to about 8.0 μm. Examples are provided herein of membranes having microporous surface pores of 0.1, 0.3, 0.45, 0.5, 0.667, 0.8, 1.0, 2.0, 3.0, and 5.0 μm. The membranes also have an opposite surface. The microporous surface is generally the surface that is exposed directly to the environment or to the quench bath during casting. The opposite surface is generally the surface that is not thus exposed—the surface that is in contact with the support structure onto which the membrane is cast. Thus, the opposite surface is sometimes referred to herein as the cast surface.

The opposite surface of membranes in accordance with the invention also comprises microporous pores that often can be larger in pore size than the pores on the microporous surface. Preferred membranes possess opposite surface pore sizes of from about 0.05, 0.1, 0.5, or 1.0 to about 10, 25, or 50 μm. Examples are provided herein of membranes possessing opposite surface pore sizes of about 3, 4, 5, 6, 20, and 30 μm.

Between the microporous surface and the opposite surface, membranes of the invention possess a porous substructure. The porous substructure can be either substantially isotropic or asymmetric. The type of structure achieved depends upon several factors, including: the type and concentration of the polymer, the solvent, and the nonsolvent; the casting conditions such as the knife gap, and the dope temperature; environmental factors such as the exposure time between casting and quenching, and the humidity of the exposure atmosphere; and the composition and temperature of the quench bath.

One feature shared by both the internally isotropic and highly asymmetric membranes in accordance with the invention is that preferred membranes possess fibrous webs of polymer material. See FIGS. 1a and 1b. In contrast, as discussed above membranes prepared by prior art processes, such as the Costar membrane (FIGS. 1c and 1d), do not appear to possess a fibrous structure of polymer material. Rather, the polymer appears to have gelled in a globular or particulate manner, similar to a sintered metal structure.

As mentioned above, membranes in accordance with the invention possess certain pore size differences between the microporous surface and the coarse pore surface. Certain membranes, however, are predominantly isotropic in substructure, while others are predominantly asymmetric in substructure. In other words, membrane in accordance with the invention possess constricted pore sizes in or adjacent to the microporous surface relative to the substructure of the membrane. The thickness of the "skin" region at either surface, however, is relatively thin: generally less than 10%, and preferably less than 7%, of the overall thickness of the membrane. The constricted pore region in or adjacent to the microporous surface allows the membranes of the present invention to be very open in substructure, which allows good flux, while maintaining good retention properties owing to the restricted pore region.

The PVDF membranes of the invention, whether highly asymmetric or internally isotropic, are characterized by a relatively large void volume. In some embodiments, the void volume is at least about 45%, 50%, or 55%. Other embodiments of the membranes of the invention have void volumes of at least about 60%, 65% or 70%. Still other embodiments of the invention have void volumes of at least about 75%, 80%, or 85%. Void volume may be determined by comparing the weight of a dry membrane and a wet membrane, or by calculating the density of a dry membrane and comparing it to the density of a solid mass of the polymer or mix of polymers of equal volume.

The membranes of the present invention are generally very "open" membranes, providing limited resistance to fluid flow, yet able to efficiently separate particles based on principles of tortuosity and minimum pore sizes. Accordingly, as will be appreciated, membranes in accordance with the invention possess exceptional flow rates. For example, the following Table sets forth microporous surface pore size, opposite surface pore size, and flow rate:

TABLE A

| Internal Structure | Microporous Surface Pore Size (μm) | Opposite Surface Pore Size (μm) | Flow Rate (cm/min @ 10 psid) |
|---|---|---|---|
| Isotropic | 0.1 | 3.0 | 7 |
| Asymmetric | 0.1 | 3.0 | 40 |
| Isotropic | 0.3 | 3.0 | 31 |
| Asymmetric | 0.45 | — | 79 |
| Asymmetric | 0.5 | 20.0 | 73 |
| Asymmetric | 0.667 | — | 81 |
| Asymmetric | 0.8 | 20.0 | 84 |
| Isotropic | 1.0 | 4.0 | 36 |
| Isotropic | 2.0 | 5.0 | 53 |
| Asymmetric | 2.0 | 30.0 | 144 |
| Asymmetric | 2.0 | 20.0 | 178 |
| Asymmetric | 2.0 | 20.0 | 268 |
| Isotropic | 3.0 | 5.0 | 72 |

It will be appreciated that membranes in accordance with the invention possess substantially improved flow rates over prior art membranes. For example in the Costar patent, Costar membranes are compared to PVDF membranes that are commercially available from Millipore Corporation. See Costar Table I, page 11. In the following Table, flow rates of membranes of the present invention are compared with Costar and Millipore membranes:

TABLE B

| Microporous Surface Pore Size | Present Invention Flow Rate | Present Invention Flow Pore Size | Costar Patent Flow Rate | Millipore Flow Rate | Millipore Mean Flow Pore Size |
|---|---|---|---|---|---|
| 0.1 | 7–40 | — | 3.6–4 | 2.9 | .228 |
| 0.22 | — | — | 8–10 | 6.5 | .424 |
| 0.3 | 31 | — | — | — | — |
| 0.45 | 79 | — | 20–60 | 16 | — |
| 0.5 | 73 | 0.85 | — | — | — |
| 0.65 | — | — | 40–50 | 38 | 1.15 |
| 0.667 | 81 | — | — | — | — |
| 2.0 | 144–268 | 1.9 | 125–190 | — | — |

Note: In the foregoing Table, all pore sizes are given in μm, and all flow rates are given in cm/min @ 10 psid.

For comparison purposes, the mean flow pore size is given where available. It is important to note that the mean flow pore sizes for the membranes of the present invention are closer to the actual skin pore sizes than is the case for the Millipore membranes tested. To assess differences in flow rate between different membranes, a comparison of membranes with similar skin pore sizes is typically done. However, the more meaningful comparison is between membranes having similar mean flow pore sizes. Such a comparison shows the dramatic improvement in the flow rate of the membranes of the present invention, as compared to the prior art membranes available, Membranes in accordance with the invention are relatively thin. For example, internally isotropic membranes in accordance with the invention can be prepared as thin as about 20–25 μm, and preferably are from about 25 to about 50 μm in thickness. Asymmetric membranes in accordance with the invention are generally slightly thicker than their internally isotropic counterparts. For example, preferred asymmetric membranes are between about 60 and about 125 μm in thickness.

Membranes in accordance with the invention are prepared with relatively high polymer concentrations, from about 12% up to 20% or more. The temperature of the dope is preferably between 21° C. and 35° C. for highly asymmetric membranes, and either below 21° C. or above 35° C. for internally isotropic membranes. Further, in preferred embodiments, following casting of the polymer dope or film, the film is exposed to humid air. Exposure times are preferably relatively long, from about 5 or 10 seconds to about 1 or 2 minutes or longer; humidity is preferably relatively high, from about 60% to about 100% relative humidity. As will be appreciated, higher humidities or longer exposure times can be utilized with a generally corresponding or commensurate decrease in the other to obtain similar results. Following exposure the film is quenched in a quench bath containing relatively high concentrations of nonsolvent for the polymer. The quench temperature is preferably between about 45° C. and 70° C.

By the above process PVDF membranes with exceptional flux properties are produced. Indeed, we have prepared membranes that possess flux rates that are comparable to asymmetric polysulfone membranes and having bubble points as low as 5 pounds per square inch differential (psid). Pounds per square inch differential is the difference in pressure existing on opposite sides of a membrane; the bubble point of a membrane correlates with the membrane's permeability, wherein a low bubble point indicates that a relatively small pressure differential is required to force air through a pre-wetted membrane. The bubble point of water for a membrane is the pressure at which bubbles will form on the opposite (low pressure) surface of a pre-wetted membrane. This describes the phenomenon of forcing liquid into the membrane and forcing internally trapped gas out of the membrane, thus forming the bubbles. A high bubble points indicates resistance to fluid flow through a membrane. The bubble points of the PVDF membranes of the invention are comparable to the bubble points of highly asymmetric Wrasidlo-type sulfone polymer membranes having similar mean flow pore sizes. This is not the case with prior art PVDF membranes, which indicates that the membranes of the present invention have porosity and flow rates that are superior to prior art PVDF membranes.

Higher polymer concentrations in the formulations of the invention impart strength and improve elongation properties of the membranes. Further, we observe a reduction in macrovoid formation in the substructure. Exposure of the cast film to humid air appears to be responsible for the creation of the open pores, in a manner similar to work that we have done with sulfone polymers that is described in copending U.S. patent application Ser. No. 08/661,839, filed Jun. 11, 1996, the disclosure of which is hereby incorporated by reference.

Interestingly, however, we observe that humid air exposure in connection with the preparation of the present membranes results in a significantly different structure than that obtained using sulfone polymers. Sulfone polymer membranes which are cast with a similar environmental exposure possess a two-tiered structure: a microporous surface, overlying an isotropic region, which overlies an asymmetric region. It appears that the isotropic region of certain membranes of the invention is created by or is at least initiated by the "vapor-phase induced precipitation process" interaction between the water vapor in the air and the polymer film, which causes homogeneous or isotropic pore formation. This is analogous to membranes of cellulose mixed esters or cellulose nitrate. However, it appears that there is negligible evaporation of solvent or nonsolvent, so that, in the quench bath, the quench liquid rushes in and fixes the isotropic region and creates and fixes the asymmetric region.

Membranes in accordance with the present invention are preferably cast containing a quantity of water, which is strictly a nonsolvent. By balancing solids concentration, humidity, and exposure time, we have synthesized highly porous membranes that have sufficient strength to qualify them for applications requiring ultrathin membranes. In the accompanying tables and SEMs we provide comparisons of formulations, pore sizes and other features and conditions. As mentioned, because of the improved strengths of the membranes in accordance with the invention, the PVDF membranes can be synthesized as highly porous ultrathin membranes, even without fabric reinforcement. However, past experience has shown that PVDF is very amenable to being cast on fabrics, if that is deemed necessary. Thus, in accordance with the invention, we also provide certain preferred lamination and reinforcement techniques.

To improve strength and handling characteristics of membranes of the invention, membranes can be laminated with or to various fabrics. For example, suitable lamination materials include woven and nonwoven materials, melt blown materials, polyesters, and polyolefins. As examples, polyester, polypropylene, nylon, polyethylene terephthalate, and polyethylene are among many polymers useful as woven or nonwoven fabric supports for the membranes of the invention. Choice of the particular lamination material to be used is made according to the particular application. In order to laminate membranes of the invention, one can utilize heat or adhesive processes or techniques, as will be appreciated by those of ordinary skill in the art.

In connection with the production of commercial quantities of PVDF membranes in accordance with the present invention, it will be understood that the casting or production line preferably has an area in which the film is subjected to humid conditions and to controlled air flow between the point of casting, such as, for example, a knife blade or slot coater, and the quench water. The same is true for the large pore sulfone polymer membranes mentioned above. However, because of differences ingestion and curing times, PVDF often requires much longer air exposure times. Accordingly, either the line speed must be slower or the humidity tunnel longer for PVDF membranes. If, for example, a PVDF membrane is cast at 20 feet per minute and requires one minute of humid air treatment, then the exposure distance must be 20 feet.

Membranes of the invention may be hydrophobic or hydrophilic. A membrane that is hydrophobic after casting may be post-treated with a wetting agent to render it hydrophilic. Suitable wetting agents include surfactants and hydrophilic polymers. Examples of useful surfactants are ZONYL (DuPont, Bloomington, Del.) and TRITON X-100 (Rohm & Haas, Philadelphia, Pa.). An example of a hydrophilic polymer is hydroxypropylcellulose (HPC). A preferred HPC treatment is to soak the membrane in a bath containing an aqueous HPC solution; the bath may also contain one or more surfactants, alone or in combination with HPC. The wetting agents may also be added to the quench bath, so that the membrane is rendered hydrophilic as part of the quenching step.

Membranes in accordance with the invention are suitable for the complete range of microporous filtration applications, including electronic water filtration where ozone is present. A very important use of membranes in accordance with the invention is in batteries, wherein a membrane may be used as a separator between different cells of a battery, or to house an alkaline gel. This application requires a highly porous ultrathin membrane, about 30 μm in thickness, resistant to propylene carbonate containing 1-molar potassium hydroxide (KOH). In water, this concentration would correspond to a pH of approximately 14. Although propylene carbonate is a latent solvent for PVDF at 80° C. and there was some concern that propylene carbonate might be a strong swelling agent even at room temperature, we have discovered that the PVDF membranes of the invention are resistant to attack by propylene carbonate, even at temperatures slightly above room temperature. Indeed, in immersion tests that we have conducted on membranes in accordance with the invention the membranes successfully withstood the severe conditions imposed by propylene carbonate containing 1-molar potassium hydroxide (KOH). Moreover, a sample of PVDF membrane in accordance with the present invention that was cast onto nonwoven nylon also withstood propylene carbonate/KOH. In each of these immersion tests, membranes prepared in accordance with the invention exhibited good chemical resistance, with no curling of the membranes and no evident weakening of the membranes.

The dope mix of the membrane may contain, in addition to PVDF, a hydrophilic polymer such as, for example, polyvinylpyrrolidone or polyethylene glycol. These polymers may enhance the viscosity of the dope mix, and may also affect the porosity and pore structure. Such hydrophilic polymers will, of course, interact with the other factors affecting the structure of the membrane, such as casting temperature, quench temperature, time of exposure to humid air, temperature and relative humidity of the air to which the membrane is exposed, and the like. The membranes of the invention may be cast without a hydrophilic polymer, or with a hydrophilic polymer having a final concentration in the dope mix of up to about 30%, often having a concentration of at least 1–3%, or in other embodiments 4–8% of the dope mix (by weight).

In addition, membranes of the invention may be internally hydrophilic. Membranes that are internally hydrophilic possess hydrophilic moieties as part of the internal structure of the membrane. These moieties are not leached out of the membrane during use. Internally hydrophilic membranes are thus highly desirable for use in applications in which rapid water wetting is beneficial, or in which leaching out of surface additives would be problematic, such as, for example, in beverage processing.

Internally hydrophilic membranes of the invention possess water flow rates and structural properties that are similar to hydrophobic PVDF membranes also disclosed herein. The internally hydrophilic membranes of the invention can be isotropic or asymmetric. These hydrophilic membranes can be made in an ultrafilter size range having MW cutoffs of, for example, 10,000, 20,000 or 30,000 daltons to about 50,000, 75,000, 100,000, or 200,000 daltons. Likewise, the invention also contemplates internally hydrophilic microfiltration membranes with pore sizes from about 0.01, 0.05, 0.1, or 0.5 micron to about 1, 2, or 3 microns.

Internally hydrophilic PVDF membranes have generally similar formulation and process parameters as their hydrophobic counterparts. For example, they are prepared with relatively high polymer concentrations, from about 12%, 12%, or 16% up to 18%, 20% or more. Typically, higher polymer concentrations give membranes with smaller limiting pores, so dope formulations used to prepare ultrafiltration membranes according to the invention may contain PVDF in concentrations of 20% or more.

Further, in preferred embodiments, following casting of the polymer dope or film, the film is exposed to humid air. Exposure times are preferably relatively long, from about 5 or 10 seconds to about 1 or 2 minutes or longer; humidity is preferably relatively high, from about 60%, 70%, or 80% to about 90% or 100% relative humidity. Following exposure the film is quenched in a quench bath containing relatively high concentrations of nonsolvent for the polymer. The quench temperature is preferably between about 45° C. and 70° C.

In addition to these formulation and process conditions, internally hydrophilic membranes may contain about 0.5% to about 4% high molecular weight PVP (greater than about 150,000 MW to 600,000 or greater), such as PVP K-90 (average MW~360,000). The membranes may also contain about 4% to about 15% lower molecular weight PVP (less than about 80,000 MW), such as PVP K-30 (average MW~45,000). In addition, they may contain about 8% to about 20% of a pore-forming agent, such as, for example, n-butanol, PEG, TAA, hexanol, 2-methyl butanol, or 2-ethyl butanol. Other hydrophilic polymers of high molecular weight and lower molecular weight, and other pore formers, can be freely substituted in these formulations as would be recognized by persons of skill in the art, keeping in mind that hydrophilic polymers having higher molecular weight ranges tend to integrate with the PVDF of the membrane to present leaching loss. For formulations used to prepare internally hydrophilic membranes, the dope mix is often used at temperatures of 35° C. to 50° C. to prevent gelling.

Hydrophilicity may be verified in several ways that are well known in the art. For example, water droplets on the surface of a dry membrane will tend to form beads if the membrane is hydrophobic, yet they typically will be absorbed by a hydrophilic membrane. Comparative degrees of hydrophilicity can be determined by relative wettability of water or by lateral flow rates of water deposited on a dry membrane. For example, membranes can be compared by depositing membrane strips or discs onto the surface of a dish or beaker containing distilled water. In such a test, hydrophilic PVDF membranes will fully wet in less than 60 seconds, and often in less than ten seconds, and in many cases, spontaneously. Hydrophobic PVDF membranes typically never wet under such conditions. Another useful indicium of membrane hydrophilicity is a low pressure water flow test. A membrane disk is placed in a filter apparatus and water is placed thereon. At a small positive pressure, significantly below the bubble point pressure of the membrane, the water flows through a hydrophilic membrane. In contrast, water flow does not begin through a hydrophobic PVDF membrane until the applied pressure equals the bubble point of the membrane.

Internally hydrophilic membranes of the invention are thus inherently water wettable and not leachable under normal conditions. The membranes do not lose their hydrophilic moieties due to leaching in normal operation filtering aqueous solutions such as water filtration for electronics, beverage and juice filtration, and the like. In some applications, it may be desirable to post-treat an internally hydrophilic membrane with additional wetting agents or surfactants after the membrane is formed in order to further enhance the properties of the membrane for certain uses. This aspect of the invention contemplates such post-treatments to create membranes that are both internally hydrophilic and surface treated with hydrophilic agents as disclosed herein.

Because many of the PVDF membrane formulations in accordance with the present invention possess high concentrations of polymer, and thus have high viscosities, formulations in accordance with the invention are well adapted to spinning microporous hollow fibers. In one embodiment of PVDF hollow fiber membranes in accordance with the invention, either air or a nonsolvent such as water, containing solvent or other chemicals such as a nonsolvent, is used as the lumen fluid and the outer surface is exposed to various environments, such as humid air, dry air, or other environments, prior to quenching in a liquid, such as water. The resulting membrane possesses tighter pores on the outside of the membrane since the solvent and nonsolvent would migrate outward as the external environmental water migrated inward. We have found that the viscosity of formulations in accordance with the invention can be made high enough to hold the forming hollow fiber membrane intact during its descent through the humid air gap.

There are several sources of PVDF, and it is available in several classes based on average molecular weight. We have found HYLAR-461 (available from Ausimont Co., Morristown, N.J.), and KYNAR-761 (available from Atochem Co., Philadelphia, Pa.), to be particularly suitable for casting the membranes of the invention.

To prepare typical membranes of the invention, PVDF and a hydrophilic polymer may be combined with a solvent, a pore former, and a non-solvent. The desired porosity of the membrane will largely determine the PVDF concentration to be employed, wherein higher concentrations generally result in "tighter" membranes with smaller particle retention capabilities. Inclusion of a proper high molecular weight hydrophilic polymer will result in internally hydrophilic membranes that do not release the hydrophilic polymer under normal conditions. Smaller molecular weight hydrophilic polymers and high-boiling point alcohols function mainly as pore-formers. Viscosity can be adjusted by the temperature of the dope mix upon casting.

The dope mix is deposited onto a moving belt and exposed to humid air for a duration of from 2, 5, 10, or 20 seconds to 30, 60, 90 or 120 seconds. Exposure to humidity can be affected both by total time of exposure, temperature of the humid gaseous environment, and relative humidity of the environment. After exposure to the humid gaseous environment, the thin membrane film moves into a bath of nonsolvent, typically water, wherein the membrane gels and solidifies. The temperature of the nonsolvent quench bath can be varied to achieve variable pore sizes.

Preferred membranes in accordance with the invention, and their process of manufacture, will now be described in accordance with the following Examples and with reference to the accompanying Figures.

EXAMPLE I

Effect of Exposure Time

We prepared a casting dope containing, by weight, 15.9% PVDF polymer HYLAR-461, 0.9% lithium chloride, 3.7% water, 2.3% polyvinylpyrrolidone (PVP K-17 MW~9,000, available from BASF, Mt Olive, N.J.), and 77.2% dimethylacetamide (DMAC) as the solvent. Several membrane samples were cast onto a moving belt of polyethylene coated paper using a casting knife with a knife gap of 7 mils (178 $\mu$m). Preferably the dope mix is below about 32° C. when cast. Following casting, the nascent membranes were exposed to air at 25–27° C. and 100% or 80% relative humidity for various times, as shown in Table I. Thereafter, the membranes were quenched in a water bath having a temperature of about 60° C.

After coagulation, the membranes were washed with deionized water and then treated for 10–15 seconds with a 0.1% aqueous hydroxypropylcellulose (HPC) solution to make the membranes hydrophilic, then air dried. The recovered membranes had thicknesses of between 25 $\mu$m and 30 $\mu$m. Each of the membranes was tested for water permeability at 10-psid on a 47 mm diameter disk (approximately 35 mm effective diameter, 9.5 cm$^2$ area). Mean flow pore sizes of the membranes were determined with a Coulter porometer, and the surfaces and cross-sections were examined by scanning electron microscopy (SEM).

Figure 2A:
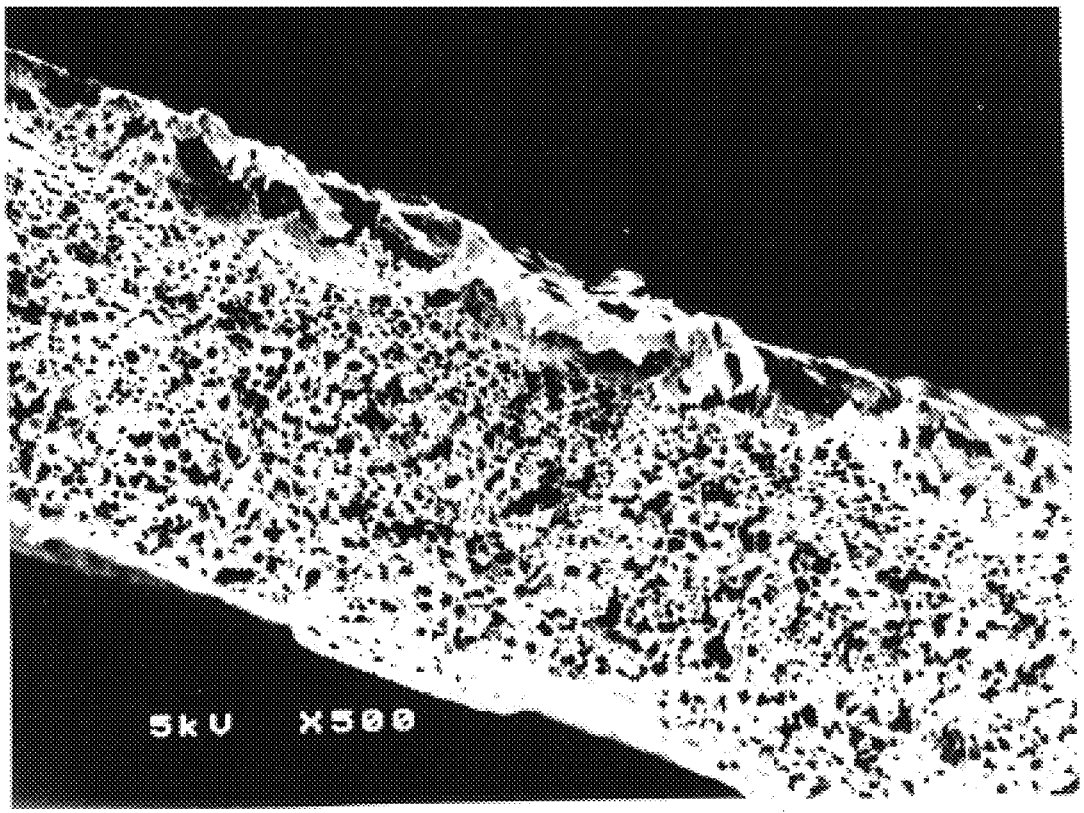
FIG. 2a is a cross-sectional view (500×).
Figure 2B:
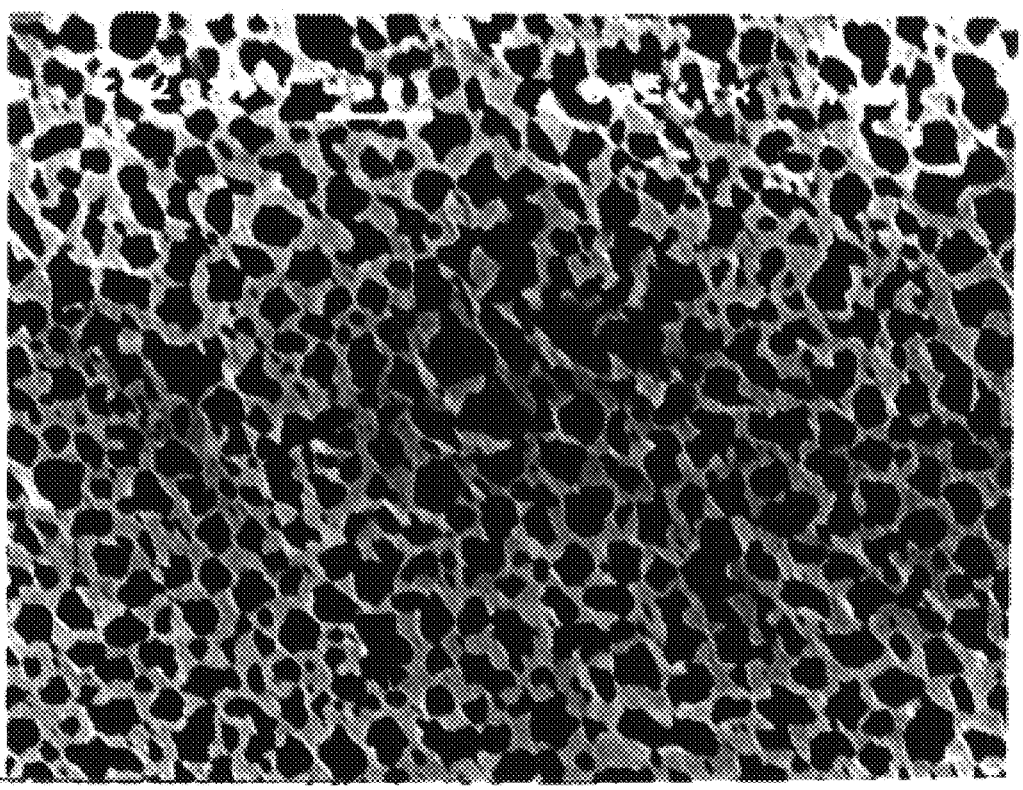
FIG. 2b is a view of the microporous surface (1,500×).
Figure 2C:
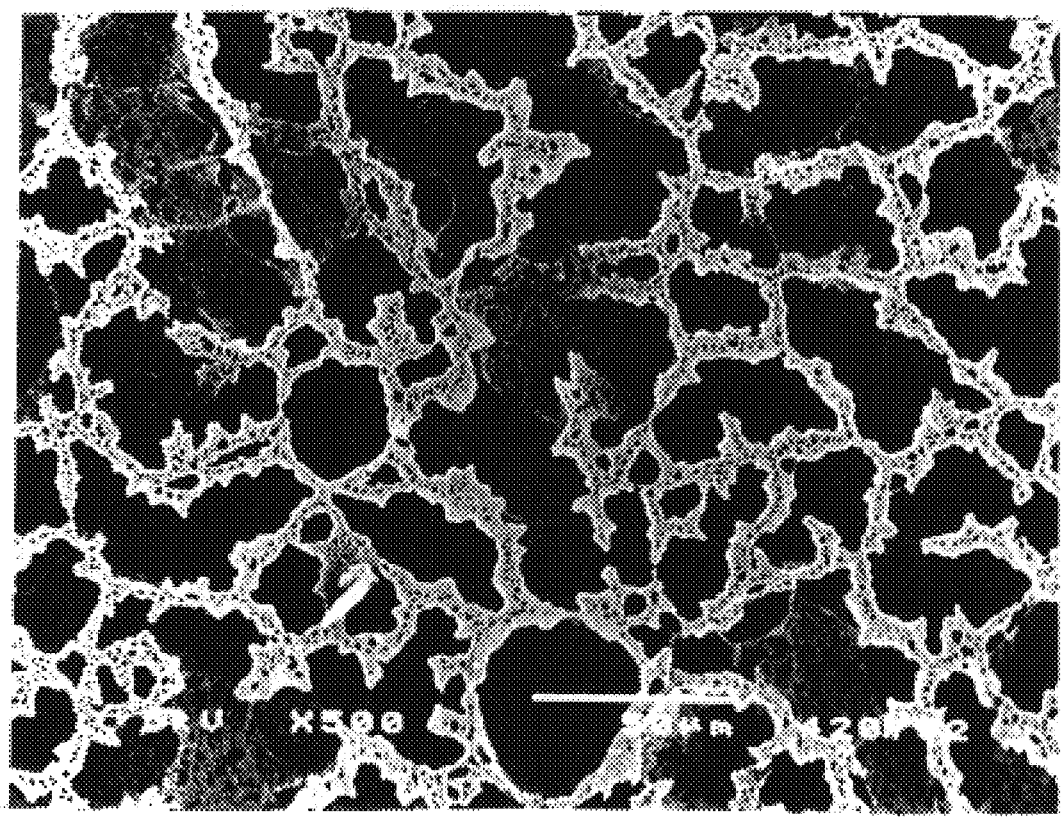
FIG. 2c is a view of the coarse pored surface (500×). The membrane has microporous surface pore sizes of approximately 0.5 μm.

A representative SEM for the membrane of Sample 1-b is provided as FIGS. 2a–2c. As will be observed from the cross-sectional view of the membrane (FIG. 2a), the membrane has a porous substructure that is substantially isotropic. However, the pores in the substructure are generally larger than the pores in and adjacent to the microporous surface. The difference in pore sizes as between the microporous surface and the coarse pored surface is readily observable when the SEM of the microporous surface (FIG. 2b) is compared with the SEM of the coarse pored surface (FIG. 2c).

Exposure conditions, water flux data, and pore sizes are shown in Table I.

TABLE I

| Sample ID | Exposure Time/ Humidity | Water Flow | Mean Flow Pore Size ($\mu$m) | Surface Pore Size (open side) | Surface Pore Size (tight side) |
|---|---|---|---|---|---|
| 1-a | 8 seconds 100% | 377 | — | 3 $\mu$m | 0.1 $\mu$m |
| 1-b | 10 seconds 100% | 694 | 0.85 | 20 $\mu$m | 0.5 $\mu$m |
| 1-c | 30 seconds 100% | 800 | 1.0 | 20 $\mu$m | 0.8 $\mu$m |
| 1-d | 20 seconds 80% | 94 | — | NA | NA |
| 1-e | 120 seconds 80% | 1364 | 1.9 | 30 $\mu$m | 2.0 $\mu$m |

Note: water flow units are ml/min/9.5 cm$^2$ @ 10 psid

EXAMPLE II

Effect of Humidity and Solvent

We prepared a casting dope containing, by weight, 16% PVDF HYLAR-461, 8.0% water, 3.0% PVP K-17, and 73% N-methylpyrrolidone (NMP) as the solvent. Two membrane samples were cast onto a moving belt of polyethylene coated paper using a casting knife with a knife gap of 7 mils. Following casting, the nascent membranes were exposed to air at 25–27° C. and 70% relative humidity for different times, as shown in Table II. Thereafter, the membranes were quenched in a water bath having a temperature of about 60° C.

After coagulation, the membranes were washed with deionized water and then treated with a 0.1% aqueous HPC solution to make the membranes hydrophilic, then air dried. The recovered membranes had thicknesses between 25 $\mu$m and 30 $\mu$m. The membranes were tested for water permeability at 10-psid on a 47-mm diameter disk. The surfaces and cross-sections of the membranes were examined by SEM. SEMs of the membranes demonstrated a similar structures to those shown in FIGS. 2a–2c. However, the cross-sectional SEMs indicated some macrovoid formation. This factor indicates that NMP may not be as good a solvent for PVDF as is DMAC, although higher polymer concentrations might remedy this problem.

Exposure conditions, water flux data, and pore sizes are shown in Table II.

TABLE II

| Sample ID | Exposure Time/ Humidity | Water Flow | Surface Pore Size (open side) | Surface Pore Size (tight side) |
|---|---|---|---|---|
| 2-a | 10 seconds 70% | 66 | 3 μm | 0.1 μm |
| 2-b | 120 seconds 70% | 344 | 4 μm | 1.0 μm |

Note: water flow units are ml/min/9.5 cm² @ 10 psid

EXAMPLE III

Effect of Polymer Concentration

In view of the presence of macrovoids in the membranes prepared in accordance with Example II, we conducted the following experiments to determine the effects of polymer concentration on membrane structure.

We prepared a casting dope containing, by weight, 20% PVDF HYLAR-461, 5.0% water, 1.5% PVP K-17, and 73.5% NMP as the solvent. Two membrane samples were cast onto a moving belt of polyethylene coated paper using a casting knife with a knife gap of 7 mils. Following casting, the nascent membranes were exposed to air at 25–27° C. and 70% relative humidity for different times, as shown in Table III. Thereafter, the membranes were quenched in a water bath having a temperature of about 55° C.

After coagulation, the membranes were washed with deionized water and then treated with a 0.1% aqueous HPC solution to make the membranes hydrophilic, then air dried. The recovered membranes had thicknesses of between 25 μm and 30 μm. The membranes were tested for water permeability at 10-psid on a 47-mm diameter disk. The surfaces and cross-sections of the membranes were examined by SEM. The membranes thus prepared had a structure virtually identical to those shown in connection with Example I and did not possess the macrovoids seen in connection with Example II.

Exposure conditions, water flux data, and pore sizes are shown in Table III.

TABLE III

| Sample ID | Exposure Time/ Humidity | Water Flow | Surface Pore Size (open side) | Surface Pore Size (tight side) |
|---|---|---|---|---|
| 3-a | 60 seconds 70% | 297 | 3 μm | 0.3 μm |
| 3-b | 120 seconds 70% | 2542 | 20 μm | 2.0 μm |

Note: water flow units are ml/min/9.5 cm² @ 10 psid

EXAMPLE IV

Effect of Humidity and Exposure Time

In view of the difference in flow rate and pore size in the membranes prepared in accordance with Example III, we conducted the following experiments to determine the effects of humidity and exposure time.

We prepared a casting dope containing, by weight, 16% PVDF HYLAR-461, 8.0% water, 3.0% PVP K-17, and 73% NMP as the solvent. Four membrane samples were cast onto a moving belt of polyethylene coated paper using a casting knife with a knife gap of 7 mils. Following casting, the nascent membranes were exposed to air at 25–27° C. and 70% or 100% relative humidity for various times, as shown in Table IV. Thereafter, the membranes were quenched in a water bath having a temperature of about 55° C.

After coagulation, the membranes were washed with deionized water and then treated with a 0.1% aqueous HPC solution to make the membranes hydrophilic, then air dried. The recovered membranes had thicknesses between 25 μm and 30 μm. The membranes were tested for water permeability at 10-psid on a 47-mm diameter disk. The surfaces and cross-sections of the membranes were examined by SEM.

Figure 3A:
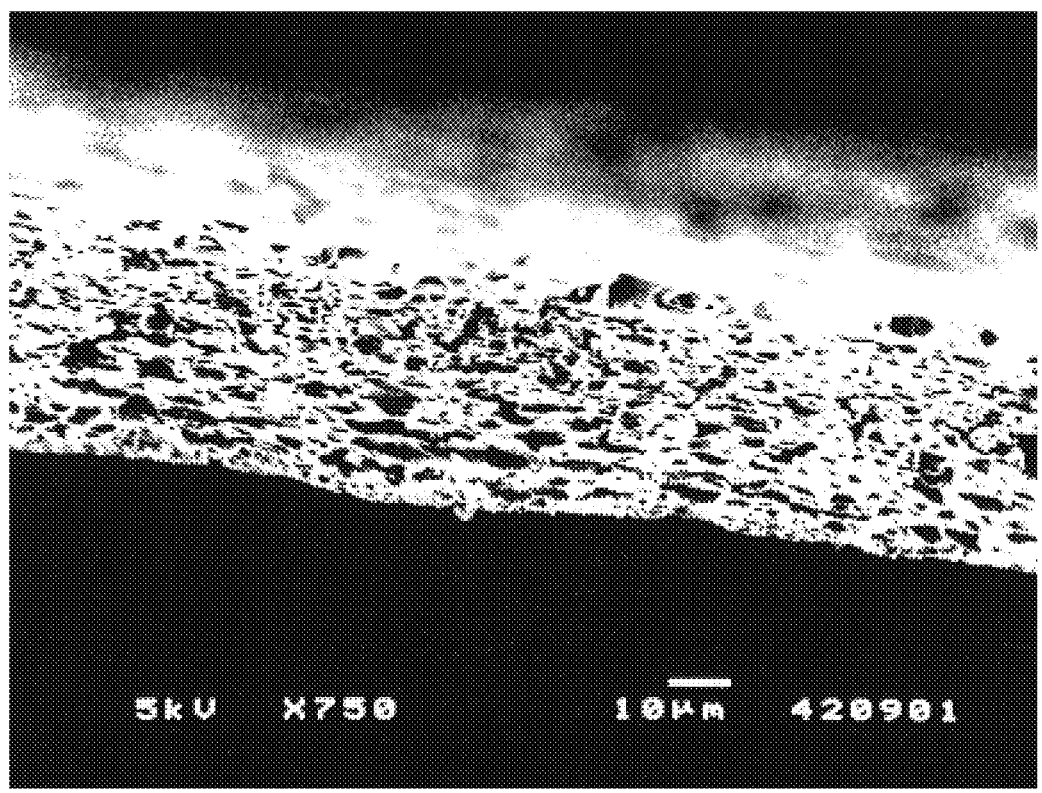
FIG. 3a is a cross-sectional view (750×).
Figure 3B:
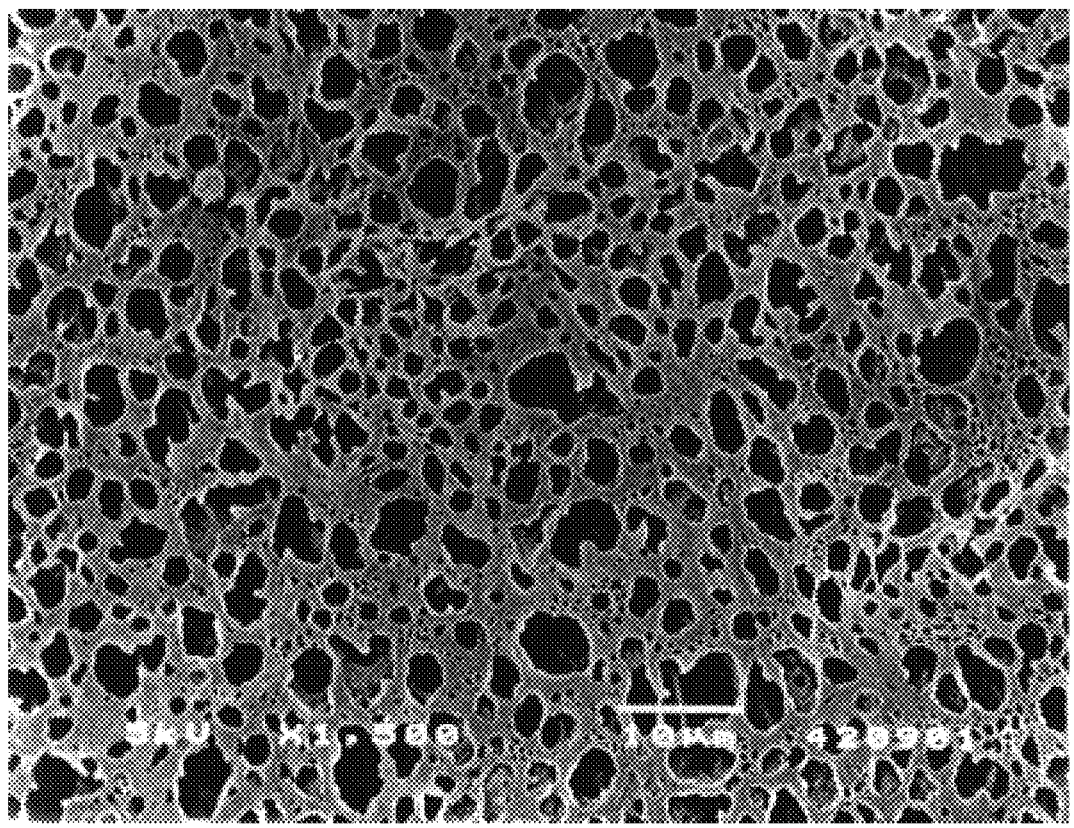
FIG. 3b is a view of the microporous surface (1,500×).
Figure 3C:
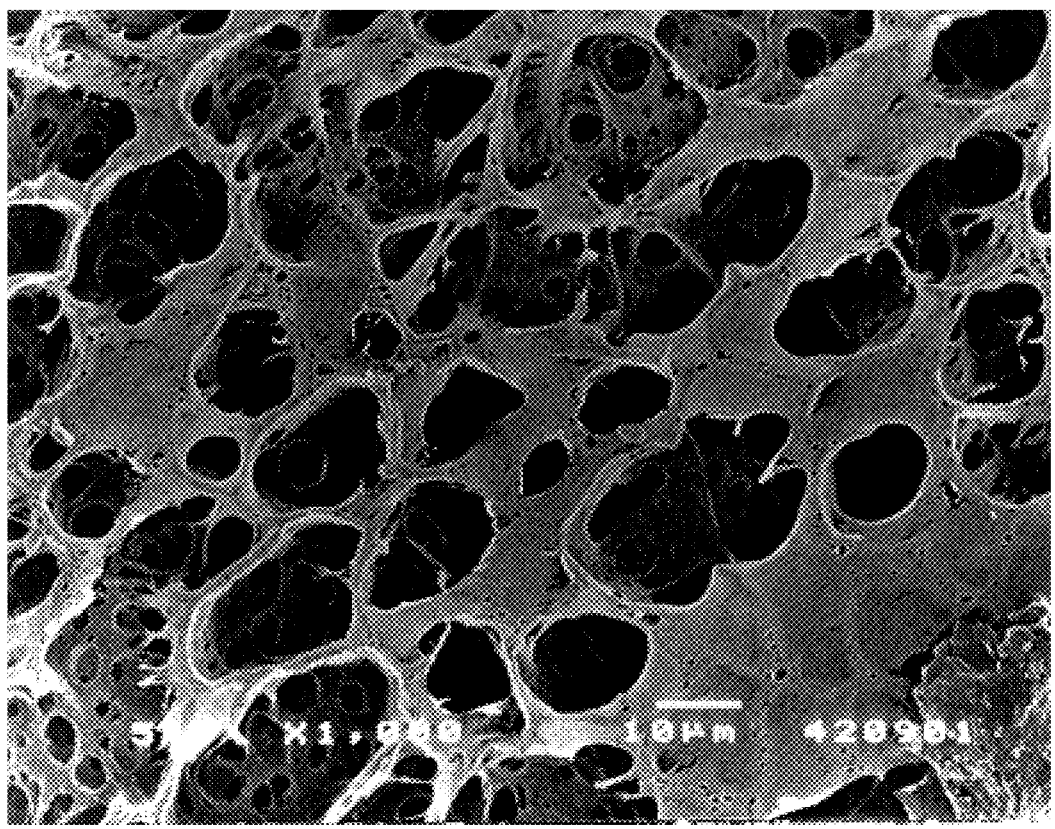
FIG. 3c is a view of the coarse pored surface (1,000×). The membrane has microporous surface pores of approximately 2 μm.
Figure 4A:
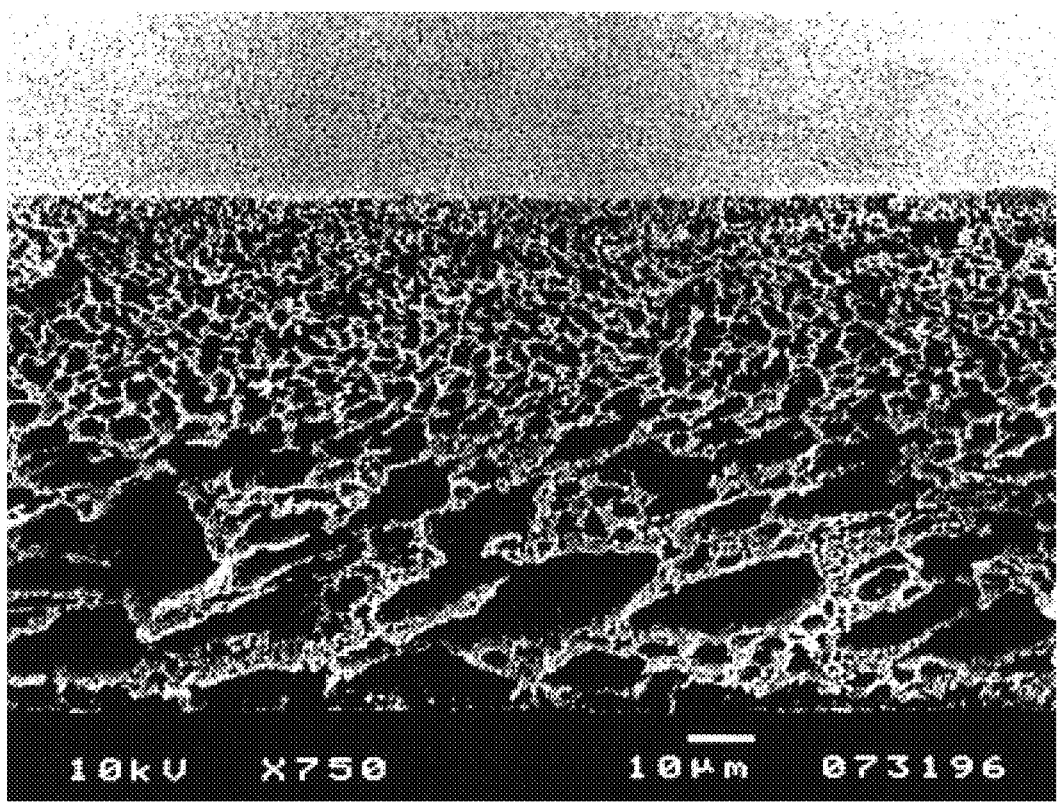
FIG. 4a is a cross-sectional view (1.0000×).

The results of a representative membrane are presented in FIGS. 3a–3c, which is a series of SEMs of the membrane prepared in connection with Sample 4-c below. FIG. 4a shows that, in cross-section, the membrane is even more open than the membrane shown in connection with Example I (FIG. 2a). Again, the membrane has a porous substructure that is substantially isotropic. However, the pores in the substructure are generally larger than the pores in and adjacent to the microporous surface. The difference in pore sizes as between the microporous surface and the coarse pored surface is readily observable when the SEM of the microporous surface (FIG. 3b) is compared with the SEM of the coarse pored surface (FIG. 3c).

Exposure conditions, water flux data, and pore sizes are shown in Table IV.

TABLE IV

| Sample ID | Exposure Time/ Humidity | Water Flow | Surface Pore Size (open side) | Surface Pore Size (tight side) |
|---|---|---|---|---|
| 4-a | 10 seconds 70% | 66 | 3 μm | 0.1 μm |
| 4-b | 120 seconds 70% | 344 | 4 μm | 1.0 μm |
| 4-c | 10 seconds 100% | 1690 | 20 μm | 2.0 μm |
| 4-d | 60 seconds 100% | 502 | 5 μm | 2.0 μm |

Note: water flow units are ml/min/9.5 cm² @ 10 psid

A comparison of the properties of membrane 4-a with those of membrane 4-c shows the dramatic difference in the effect of 70% humidity versus 100% humidity at this temperature. Likewise, a comparison of the properties of the properties of membrane 4-a with those of membrane 4c demonstrates that increased exposure time can compensate somewhat for the lower humidity. However, membrane 4-d showed a decreased flow rate and smaller pore size on the open side of the membrane, as compared with the membrane of Example 4-c. This demonstrates that, at 100% humidity, a membrane may be overexposed, and that the interaction of relative humidity and exposure time is not synergistic in all cases.

EXAMPLE V

Effect of Solvent

We prepared a casting dope containing, by weight, 13.8% PVDF HYLAR-461, 6.9% glycerine, 1.7% water, 2.0% PVP K-17, and 75.6% dimethylformamide (DMF) as the solvent. Two membrane samples were cast onto a moving belt of polyethylene coated paper using a casting knife with a knife gap of 7 mils. Following casting, the nascent membranes were exposed to air at 25–27° C. and 100% relative humidity for different times, as shown in Table V. Thereafter, the membranes were quenched in a water bath having a temperature of about 60° C.

After coagulation, the membranes were washed with deionized water and then treated with a 0.1% aqueous HPC solution to make the membranes hydrophilic, then air dried. All of the resulting membranes had thicknesses of between 25 μm and 30 μm. The recovered membranes were tested for water permeability at 10-psid on a 47-mm diameter disk. The surfaces and cross-sections of the membranes were examined by SEM. The structures observed through the SEMs possessed a similar appearance to those shown in connection with Examples I and IV.

Exposure conditions, water flux data, and pore sizes are shown in Table V.

TABLE V

| Sample ID | Exposure Time/ Humidity | Water Flow | Surface Pore Size (open side) | Surface Pore Size (tight side) |
|---|---|---|---|---|
| 5-a | 10 seconds 100% | 682 | 5 μm | 3 μm |
| 5-b | 60 seconds 100% | 199 | 6 μm | 5 μm |

Note: water flow units are ml/min/9.5 cm² @ 10 psid

EXAMPLE VI

Preparation of Supported Membrane

We prepared a casting dope containing, by weight, 15.4% PVDF HYLAR-461, 7.4% water, and 77.2% DMF as the solvent. Two membrane samples were cast onto a nonwoven nylon support using a casting knife with a knife gap of 7 mils. Following casting, the nascent membranes were exposed to air at 25–27° C. and 100% relative humidity for either 10 seconds or 60 seconds. Thereafter, the membranes were quenched in a water bath having a temperature of about 60° C.

After coagulation, the membranes were washed with deionized water and then treated with a 0.1% aqueous HPC solution to make the membranes hydrophilic, then air dried.

The recovered membranes were immersed into solutions of propylene carbonate containing 1-molar KOH (pH approximately 14). Upon recovery of the membranes from immersion, similar to the following Example, there was no evidence of any deterioration or loss of strength of the membranes. No significant change of tensile strength and elongation was observed.

EXAMPLE VII

Tensile Strength and Elongation at Break

We prepared a casting dope containing, by weight, 15.4% PVDF HYLAR-461, 7.4% water, and 77.2% DMF as the solvent. Two membrane samples were cast onto a moving belt of polyethylene coated paper using a casting knife with a knife gap of 7 mils. Following casting, the nascent membranes were exposed to air at 25–27° C. and 100% relative humidity for either 10 seconds or 60 seconds. Thereafter, the membranes were quenched in a water bath having a temperature of about 60° C.

After coagulation, the membranes were washed with deionized water and then treated with a 0.1% aqueous HPC solution to make the membranes hydrophilic, then air dried.

The recovered membranes were immersed into solutions of propylene carbonate containing 1-molar KOH (pH approximately 14). Upon recovery of the membranes from immersion, there was no evidence of any deterioration or loss of strength of the membranes. No substantial change of tensile strength and elongation was observed, as shown in Table VII.

TABLE VII

| Exposure Time (Days) | Membrane Thickness (μm) | Tensile Strength (g/cm²) | Elongation at Break (%) |
|---|---|---|---|
| 1 | 30 | 725 | 77 |
| 7 | 30 | 700 | 65.7 |
| 14 | 30 | 748 | 69.2 |
| 22 | 30 | 793 | 64 |

EXAMPLE VIII

Preparation of Asymmetric PVDF Membrane

We prepared a highly asymmetric PVDF membrane from a casting dope containing, by weight, 14.6% PVDF HYLAR-461, 18.8% t-amyl alcohol, 4.8% PVP K-30 (average M.W.~45,000), 2.3% water, and 59.5% DMF as the solvent. The sample was cast onto a moving belt of polyethylene coated paper using a casting knife with a knife gap of 12 mils. The temperature of the dope mix was kept between 21° C. and 35° C. at all times. Following casting, the nascent membrane was exposed to air at 25–27° C. and 80% relative humidity for 25 seconds. Thereafter, the membrane was quenched in a water bath having a temperature of about 56° C.

Figure 4B:
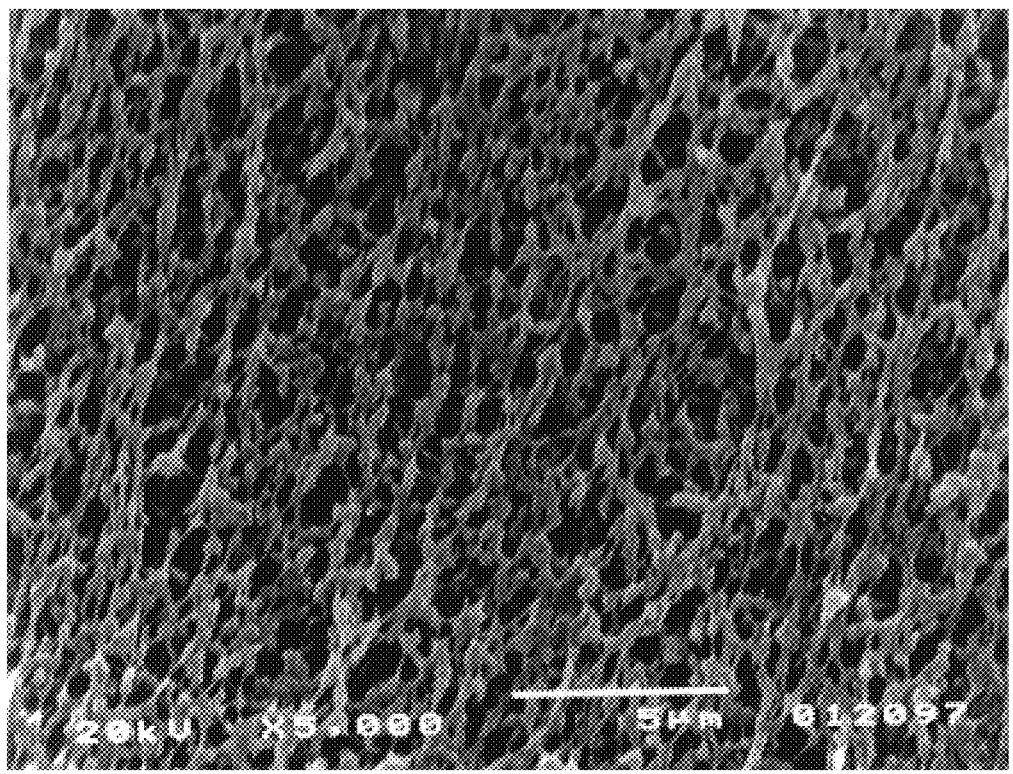
FIG. 4b is a view of the microporous surface (5,000×). The membrane has microporous surface pores of approximately 0.45 μm.

After coagulation, the membrane was washed with deionized water and then treated with a 0.1% aqueous HPC solution to make the membrane hydrophilic. Thereafter, the membrane was oven dried at about 70° C. and tested for water permeability at 10-psid on a 47-mm diameter disk. The resulting membrane had a thicknesses of about 70 μm to 100 μm. The surface and cross-section of the membrane were examined by SEM. FIGS. 4a and 4b show microporous surface and cross-sectional views of the membrane. As will be observed from the cross-sectional view (FIG. 4a), the membrane possesses a graded pore structure from the microporous surface into and through a substantial portion of the substructure of the membrane. Such graded pore structure shows classic asymmetric structure wherein there is a gradual increase in pore size from the microporous surface into the substructure of the membrane. Water flux and pore size are shown in Table VIII.

TABLE VIII

| Sample ID | Water flow (ml/min/9.5 cm² @ 10 psid) | Membrane Pore Size |
|---|---|---|
| 8 | 750 | 0.45 μm |

EXAMPLE IX

Preparation of Asymmetric PVDF Membrane

We prepared a highly asymmetric PVDF membrane from a casting dope containing, by weight, 14.6% PVDF HYLAR-461, 18% t-amyl alcohol, 4.8% PVP K-30, 2.3% water, and 60.3% DMF as the solvent. The sample was cast onto a moving belt of polyethylene coated paper using a casting knife with a knife gap of 9.5 mils. Following casting, the nascent membrane was exposed to air at 25–27° C. and 100% relative humidity for 25 seconds. Thereafter, the membrane was quenched in a water bath having a temperature of about 50° C.

After coagulation, the membrane was washed with deionized water and then treated with a 0.1% aqueous HPC solution to make the membrane hydrophilic. Thereafter, the membrane was air dried and tested for water permeability at 10-psid on a 47-mm diameter disk. Mean flow pore size was also determined with a Coulter porometer. The resulting membrane had a thickness of between 50 μm and 75 μm.

Water flux and pore size are shown in Table IX.

TABLE IX

| Sample ID | Water flow (ml/min/9.5 cm$^2$ @ 10 psid) | Membrane Pore Size |
|---|---|---|
| 7 | 769 | 0.667 μm |

EXAMPLE X

Preparation of Hydrophobic PVDF Membrane

We prepared a PVDF membrane according to the formulation and procedure of Example VIII, the only difference being no post-treatment of the membrane with HPC. The water flow and membrane pore size were identical to those given in Table VIII. However, the membrane required prewetting with a 50% aqueous solution of isopropyl alcohol. Other prewetting solutions suitable for hydrophobic membranes of the invention include glycerine, Zonyl, Triton, PVP, and HPC.

EXAMPLE XI

Preparation of Internally Isotropic PVDF Membrane

We prepared an internally isotropic PVDF membrane from a casting dope formulation identical to that of Example VIII, but cast the membrane with the temperature of the dope mix above 35° C. FIG. 3a shows the membrane in cross section, and FIGS. 3b and 3c show the microporous surface and the opposite surface, respectively. As will be observed from the cross-sectional view (FIG. 3a), the membrane possesses a substantially constant pore structure in a central region between a dense region adjacent to the microporous surface and an "opposite skin" region adjacent to the opposite surface of the membrane. This substantially constant pore structure is a preferred embodiment of the internally isotropic PVDF membrane of the invention.

EXAMPLE XII

Properties of HYLAR-461 and KYNAR-761

A preferred form of PVDF is available under the brand name HYLAR-461. Another preferred form of PVDF is available under the brand name KYNAR-761. The present invention contemplates membranes cast using any suitable form of PVDF. The invention preferably employs HYLAR-461, KYNAR-761, or a substantially similar material that has properties similar to those provided Table X.

TABLE X

| Property | HYLAR-461 | KYNAR-761 |
|---|---|---|
| Specific Gravity | 1.75–1.77 | 1.78 |
| Specific Volume | 0.56–0.57 cc/g | 0.56 cc/g |
| Refractive Index | 1.42 | — |
| Melting Point | 311–320° F. | 352° F. |
| Mold Shrinkage | 2–3% | — |
| Water Absorption | 0.04% | <0.04% (24h) |
| Tensile Strength at Yield | 4000–6000 psi at 77° F. 2000–3000 psi at 212° F. | — |
| Tensile Strength at Break | 4500–7500 psi at 77° F. 2500–3500 psi at 212° F. | 7800 psi |
| Thermal Conductivity | 0.70–0.87 BTU in/hr ft$^2$ ° F. | 1.32 BTU in/hr ft$^2$ ° F. |
| Specific Heat | 0.30–0.34 BTU/lb/° F. | 0.23 BTU/lb/° F. |
| Melt Viscosity | 25,500–30,000 poise at 100/sec and 450° F. | — |

EXAMPLE XIII

Preparation of Internally Hydrophilic PVDF Membrane

We prepared an internally hydrophilic PVDF membrane from a casting dope containing, by weight, 16% PVDF HYLAR-461, 12.8% n-butanol, 5.9% PVP K-30, 1.6% PVP K-90, 2.4% water, and 61.3% DMF as the solvent. This solution was kept warm at 37–44° C., to prevent gelling. The membrane was cast onto a moving belt of polyethylene coated paper using a casting knife. Following casting, the nascent membrane was exposed to air at 25–27° C. and 80% to 100% relative humidity for 20 seconds. Thereafter, the membrane was quenched in a water bath having a temperature of about 55° C.

Figure 5A:
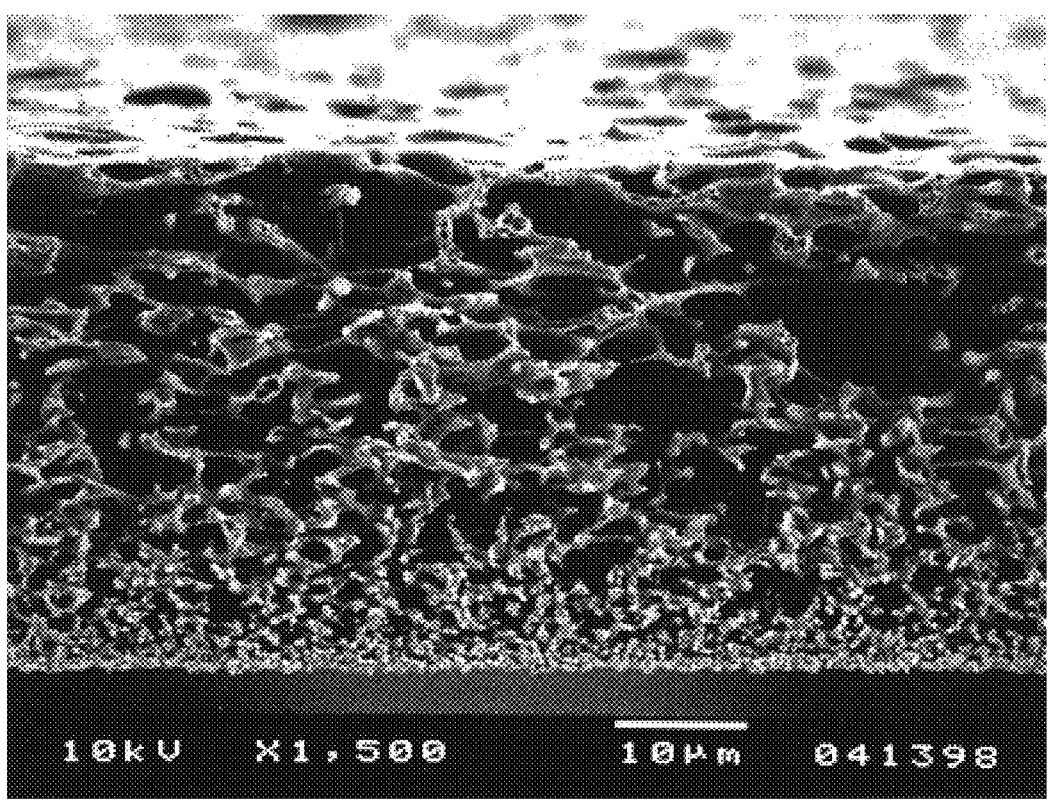
FIG. 5a is a cross-sectional view (1500×).
Figure 5B:
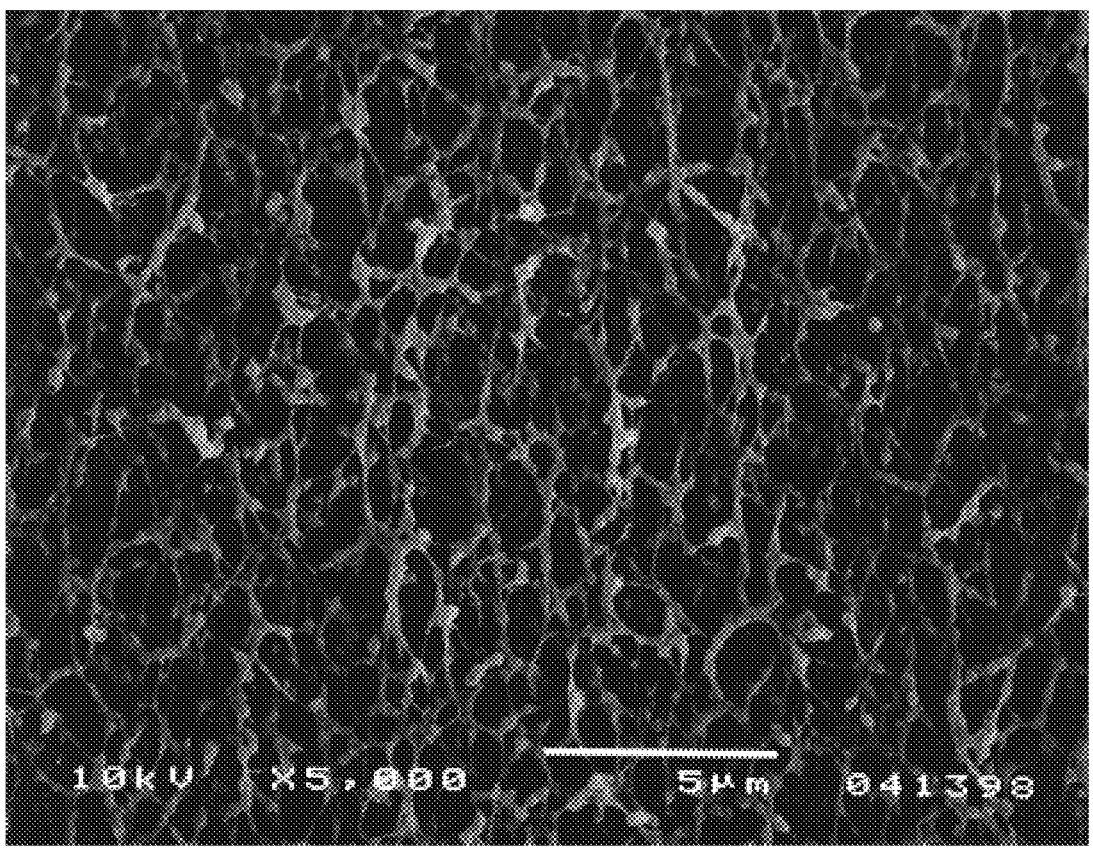
FIG. 5b is a view of the microporous surface (5,000×). The membrane has microporous surface pores of approximately 0.5 μm.

After coagulation, the membrane was washed with deionized water and then air dried. This membrane was found to be hydrophilic; this property did not change even after numerous thorough washings. SEM showed the membrane to be highly asymmetric and microporous, as shown in FIGS. 5a and 5b.

Water flux and pore size are shown in Table IX.

TABLE XI

| Sample ID | Water flow (ml/min/9.5 cm$^2$ @ 10 psid) | Membrane Pore Size |
|---|---|---|
| 11 | 405 | 0.5 μm |

EQUIVALENTS

The present invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set axforth, and as fall within the scope of the invention and any equivalents thereof.

What is claimed is:

1. An internally hydrophilic polyvinylidene difluoride polymer membrane, said membrane having a first surface comprising minimum pores, said minimum pores having a first average diameter, a second surface comprising maximum pores, said maximum pores having a second average diameter, and a thickness therebetween, the thickness therebetween comprising a porous support formed from filamentous webs of polymer material, said polymer material having integrally located therein sufficient hydrophilic moieties to render said membrane inherently water wettable, said hydrophilic moieties forming a permanent part of the membrane.

2. The membrane of claim 1, wherein said membrane is an ultrafilter, capable of substantially excluding from passage therethrough molecules or particles having a molecular weight greater than or equal to about 10,000 daltons.

3. The membrane of claim 2, wherein the molecular weight is about 100,000 daltons.

4. The membrane of claim 1, wherein said minimum pores are between about 0.01 micron and about 3.0 microns in diameter.

5. The membrane of claim 1, the membrane having an integral asymmetric structure, wherein said first average diameter is less than said second average diameter, and wherein said porous support comprises openings in said filamentous web, said openings increasing gradually in size in a gradient from said first surface toward said second surface.

6. The membrane of claim 5, wherein a ratio of said second average diameter and said first average diameter is between about 5 and about 10,000.

7. The membrane of claim 1, further comprising from about 1% to about 30% by weight polyvinylnpyrrolidone.

8. The membrane of claim 7, wherein the polyvinylpyrrolidone comprises a form having an average molecular weight of about 45,000 daltons.

9. The membrane of claim 7, wherein the polyvinylpyrrolidone comprises a form having an average molecular weight of about 360,000 daltons.

10. The membrane of claim 7, wherein the polyvinylpyrrolidone comprises at least a first and a second form, wherein said first form has an average molecular weight of about 45,000 daltons and said second form has an average molecular weight of about 360,000 daltons.

11. The membrane of claim 1, further comprising a supporting material laminated thereto.

12. The membrane of claim 11, wherein the supporting material is a nonwoven polymer fabric.

13. The membrane of claim 1, wherein the membrane is a hollow fiber.

14. The membrane of claim 1, having a flow rate of water of from about 25 to about 500 cm/min at 10 psid.

15. The membrane of claim 1, having a bubble point of water of from about 0.5 to about 50 psid.

16. The membrane of claim 1, the membrane having an isotropic structure through at least about 80% of the thickness of the membrane.

17. A method of preparing a polyvinylidene difluoride membrane comprising the steps of:

providing a casting dope comprising between about 12% and 20% by weight of polyvinylidene difluoride and between about 1% and 30% by weight of a hydrophilic polymer, dissolved in a solvent;

casting the dope to form a thin film;

exposing the thin film to a humid gaseous environment;

coagulating the film in a water bath; and recovering a formed, internally hydrophilic, polyvinylidene difluoride polymer membrane, said membrane having a first surface comprising minimum pores, said minimum pores having a first average diameter, a second surface comprising maximum pores, said maximum pores having a second average diameter, and a thickness therebetween, the thickness therebetween comprising a porous support formed from filamentous webs of polymer material, said polymer material having integrally located therein sufficient hydrophilic moieties to render said membrane inherently water wettable, said hydrophilic moieties forming a permanent part of the membrane.

18. The method of claim 17, wherein the dope has a temperature of between about 35° C. and about 50° C. during the casting step.

19. The method of claim 17, wherein the gaseous environment has a relative humidity of water between about 50% and 100%.

20. The method of claim 17, wherein the exposing step has a duration of about 2 seconds to about 120 seconds.

21. The method of claim 17, wherein the water bath has a temperature between about 20° C. and 80° C.

22. The method of claim 17, wherein the hydrophilic polymer comprises polyvinylpyrrolidone.

23. The method of claim 22, wherein the polyvinylpyrrolidone comprises a form having an average molecular weight of about 45,000 daltons.

24. The method of claim 22, wherein the polyvinylpyrrolidone comprises a form having an average molecular weight of about 360,000 daltons.

25. The method of claim 22, wherein the polyvinylpyrrolidone comprises at least a first and a second form, wherein said first form has an average molecular weight of about 45,000 daltons and said second form has an average molecular weight of about 360,000 daltons.

26. The method of claim 17, comprising the additional step of laminating to the formed membrane a support material.

27. The method of claim 26, wherein the support material is a nonwoven polymer fabric.

28. An internally isotropic, internally hydrophilic, inherently water wettable, polyvinylidene difluoride polymer membrane, said membrane having hydrophilic moieties, said hydrophilic moieties forming a permanent part of the membrane, the membrane having a first surface comprising minimum pores, the minimum pores having a first average diameter, an opposite surface comprising maximum pores, the maximum pores having a second average diameter, and a thickness therebetween, the thickness therebetween comprising a porous support formed from filamentous webs of polymer material, wherein the porous support comprises flow channels having diameters, and wherein the diameters of the flow channels substantially correspond to the first average diameter within a first region of the porous support, the first region of the porous support being adjacent the microporous surface, and wherein the diameters of the flow channels substantially correspond to the second average diameter within a second region of the porous support, the second region of the porous support being adjacent the opposite surface, and wherein the diameters of the flow channels between the first region of the porous support and the second region of the porous support are substantially constant.

* * * * *